United States Patent
Mishima et al.

(10) Patent No.: US 7,502,528 B2
(45) Date of Patent: Mar. 10, 2009

(54) IMAGE MATCHING APPARATUS, METHOD OF MATCHING IMAGES, AND COMPUTER PROGRAM PRODUCT

(75) Inventors: Nao Mishima, Kanagawa (JP); Go Ito, Tokyo (JP); Masahiro Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 563 days.

(21) Appl. No.: 11/223,050

(22) Filed: Sep. 12, 2005

(65) Prior Publication Data

US 2006/0078206 A1 Apr. 13, 2006

(30) Foreign Application Priority Data

Sep. 29, 2004 (JP) ............... 2004-285241

(51) Int. Cl.
*G06K 9/32* (2006.01)
(52) U.S. Cl. .................. 382/294; 382/107; 382/219
(58) Field of Classification Search ............... 382/278, 382/282, 291, 293, 107, 209, 219
See application file for complete search history.

(56) References Cited

U.S. PATENT DOCUMENTS

| | | | | |
|---|---|---|---|---|
| 5,585,875 A * | 12/1996 | Imafuji et al. | ............... | 396/55 |
| 5,771,405 A * | 6/1998 | Hirano | ............... | 396/55 |
| 5,844,612 A * | 12/1998 | Israelsen | ............... | 375/240.14 |
| 5,953,544 A * | 9/1999 | Kai et al. | ............... | 396/55 |
| 6,003,405 A * | 12/1999 | Giard | ............... | 74/551.3 |
| 6,040,865 A * | 3/2000 | Kato et al. | ............... | 375/240.16 |
| 6,344,876 B2 * | 2/2002 | Shiomi | ............... | 348/208.1 |
| 7,005,079 B2 * | 2/2006 | Chao et al. | ............... | 216/42 |
| 2003/0174777 A1 | 9/2003 | Itoh et al. | | |
| 2004/0046891 A1 | 3/2004 | Mishima et al. | | |
| 2004/0240551 A1 | 12/2004 | Itoh et al. | | |
| 2004/0246374 A1 | 12/2004 | Mishima et al. | | |
| 2005/0053291 A1 | 3/2005 | Mishima et al. | | |
| 2005/0100095 A1 | 5/2005 | Itoh et al. | | |
| 2005/0157792 A1 | 7/2005 | Baba et al. | | |

FOREIGN PATENT DOCUMENTS

JP 2927350 7/1999

OTHER PUBLICATIONS

Tekalp; "Digital Video Processing", Prentice Hall, Inc., pp. 72-150, 1995.

* cited by examiner

*Primary Examiner*—Yosef Kassa
(74) *Attorney, Agent, or Firm*—Finnegan, Henderson, Farabow, Garrett & Dunner, L.L.P.

(57) ABSTRACT

An image matching apparatus includes a numerical analyzing unit that solves an equation of motion numerically. The equation of motion is formulated as an image matching state transition model representing a mapping relation between a source image and a destination image. The equation of motion represents a force applied on each lattice point of the destination image including potential energy force. The numerical analyzing unit calculates the potential energy force, and sets a convergence value of a solution of the equation of motion as a mapping relation between the lattice point of the source image and the lattice point of the destination image based on the numerical analysis.

14 Claims, 28 Drawing Sheets

FIG.10
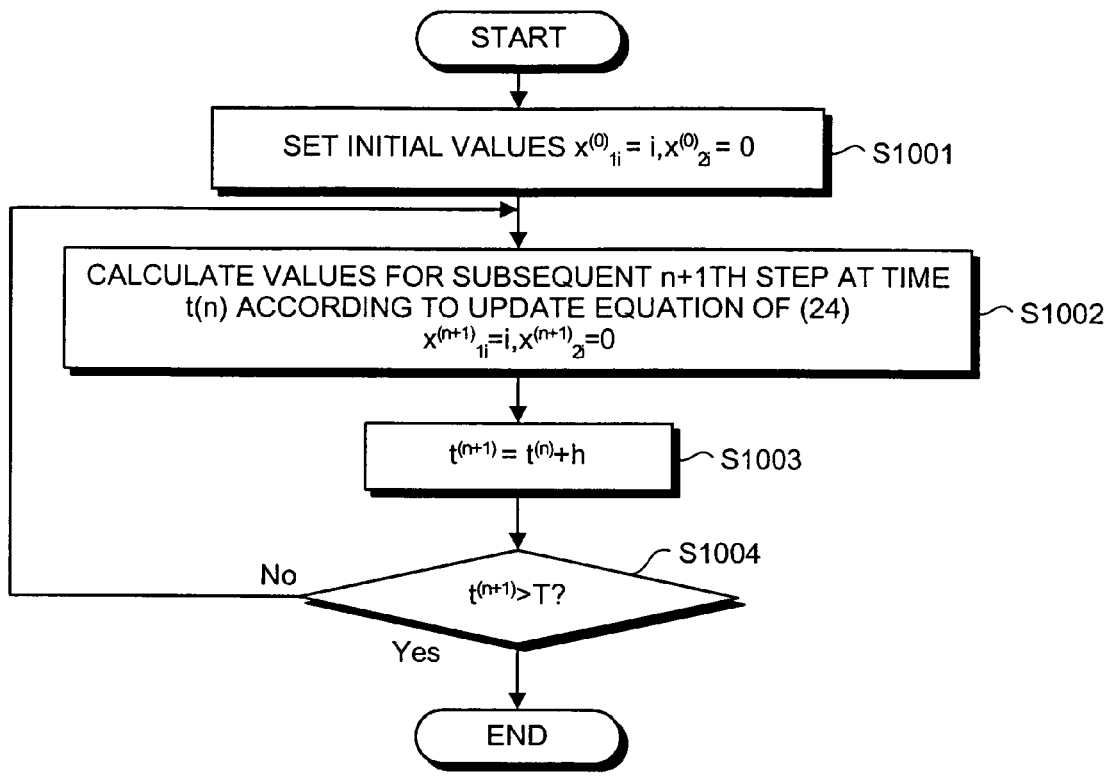
FIG.11
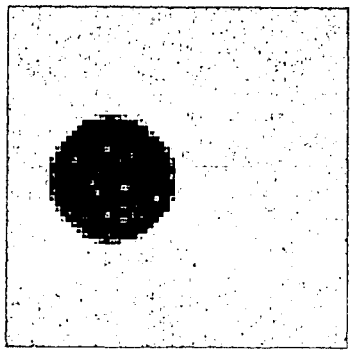
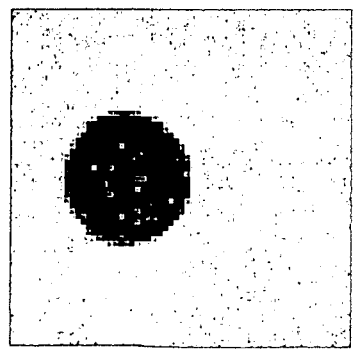
MOVE BY TWO
PIXELS

IMAGE MATCHING APPARATUS, METHOD OF MATCHING IMAGES, AND COMPUTER PROGRAM PRODUCT

CROSS-REFERENCE TO RELATED APPLICATIONS

This application is based upon and claims the benefit of priority from the priority Japanese Patent Application No. 2004-285241, filed on Sep. 29, 2004; the entire contents of which are incorporated herein by reference.

BACKGROUND OF THE INVENTION

1. Field of the Invention

The present invention relates to an image matching apparatus which detects corresponding points in a source image and a target image to associate the same with each other, a method of matching images, and computer program product therefor.

2. Description of the Related Art

Image matching is a technique for detecting corresponding points of respective pixels in one source image (starting image) from another destination image (ending image) to find correspondence therebetween. The image matching techniques are utilized in various image processing such as motion detection of moving pictures, stereo matching, image morphing, image recognition, and moving picture encoding.

The image matching techniques can be classified into four main types, i.e., optical flow methods, block-based methods, gradient methods, and Bayesian methods, as disclosed in A. Murat Tekalp, "Digital Video Processing," Prentice Hall, 1995.

According to the optical flow methods, an optical flow equation is derived based on an assumption of "constant luminance change," to find the optical flow based on the optical flow equation as a constraint condition. On the other hand, according to the block-based methods, the image is divided into predetermined blocks, and motion is detected according to a template matching for each block. According to the gradient methods, matching is performed in a direction of descent of the luminance gradient in the image. In the Bayesian methods, matching is performed according to probabilistic likelihood.

Another highly robust conventional image matching technique is disclosed in Japanese Patent Publication No. 2927350, where plural multiresolution image pyramids are generated by plural multiresolution filters, and the matching is performed sequentially from an upper layer to a lower layer of the generated image pyramids, thereby allowing for the association of various motions ranging from rough motion to subtle motion of the images.

The conventional image matching techniques, however, are not immune to problems. The optical flow methods, being sensitive to noises by nature, have difficulties in dealing with fast motion. The block-based methods which perform the image matching for each block in the image, though presenting a high reliability in processing of motions such as horizontal translation of an object in the image, basically cannot maintain such a quality when the object in the image is, for example, transformed or rotated. The gradient methods which perform the matching in the direction of descent of the luminance gradient of the image have difficulties in constantly searching the motion of the object. Further, in the Bayesian methods, a global optimal point cannot be determined with ease.

In addition, the technique disclosed in Japanese Patent Publication No. 2927350 essentially requires plural multiresolution filters for the matching of the uppermost layer down to the lowermost layer of the multiresolution image pyramids, which entails difficulties in reduction of computational cost and structural expansion.

Thus, according to the conventional image matching techniques, the reliability of the method can be compromised depending on the presence of noise and motion of the image object. In addition, the improvement in the reliability of the image matching technique inevitably accompanies a further complication of the structure and the process, and ends up in limited expandability.

SUMMARY OF THE INVENTION

According to one aspect of the present invention, an image matching apparatus comprises a numerical analyzing unit that solves an equation of motion numerically, the equation of motion including a potential energy force applied on each of lattice points each corresponding to a source pixel at a source position of each of the lattice points on a source image, the numerical analyzing unit including a potential energy force calculator that calculates the potential energy force for each of the lattice points based on a pixel value gradient between the source pixel and pixels in region corresponding to the current position on the destination image; and a mapping unit that sets the source position and a convergence value of the current position as a mapping relation between the source image and the destination image.

According to another aspect of the present invention, a method of matching images comprises steps of solving an equation of motion numerically, the equation of motion including a potential energy force applied on each of lattice points each corresponding to a source pixel at a source position of each of the lattice points on a source image, the numerical analyzing unit including a potential energy force calculator that calculates the potential energy force for each of the lattice points based on a pixel value gradient between the source pixel and pixels in region corresponding to the current position on the destination image; and setting the source position and a convergence value of the current position as a mapping relation between the source image and the destination image.

According to still another aspect of the present invention, a computer program product according to still another aspect of the present invention causes a computer to perform the method according to the present invention.

BRIEF DESCRIPTION OF THE DRAWINGS

FIG. 10 is a flowchart of a process sequence of solution of an ordinary differential equation by a numerical analyzing unit;

FIG. 11 is an explanatory diagram of a change in an image employed in a first simulation;

DETAILED DESCRIPTION OF THE PREFERRED EMBODIMENTS

Exemplary embodiments of an image matching apparatus, a method of matching images, and a computer program product for image matching according to the present invention will be described in detail below with reference to the accompanying drawings. In the description of embodiments hereinbelow, the image matching apparatus, the method of matching images, and the computer program product for image matching according to the present invention are applied for an image matching by a motion compensating apparatus that compensates motion of a moving picture to generate a compensated image, a method of compensating motion, and a computer program product for motion compensation.

It should be noted that the present invention is applicable to other image processing, such as stereo matching, image morphing, image recognition, and encoding of motion picture, other than to the image matching for the motion compensation.

First Embodiment

Figure 1:
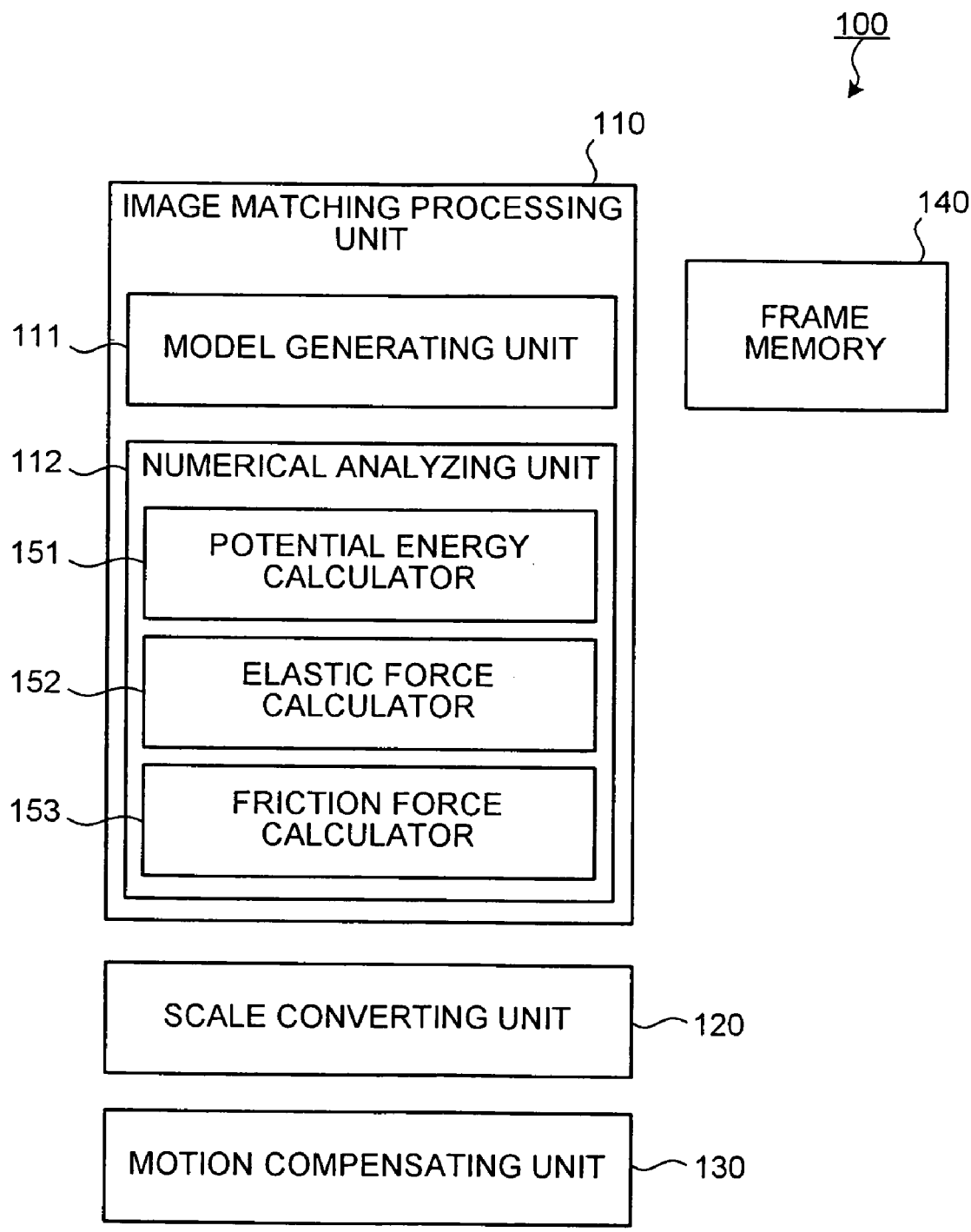
FIG. 1 is a block diagram of a functional structure of a motion compensating apparatus according to a first embodiment.

FIG. 1 is a block diagram of a functional structure of a motion compensating apparatus according to a first embodiment. The motion compensating apparatus according to the first embodiment, as shown in FIG. 1, mainly includes an image matching processing unit 110, a scale converting unit 120, a motion compensating unit 130, and a frame memory 140.

The image matching processing unit 110 selects any two images (as a starting image and a ending image) from an input image stream and performs a matching process on the starting image (source image) and the ending image (destination image). The image matching processing unit 110 includes a model generating unit 111 and a numerical analyzing unit 112.

The model generating unit 111 serves to create a dynamic image matching state transition model which is represented as an ordinary differential equation related with a position and a velocity of each point on the destination image. Each point on the destination image is mapped onto a corresponding point on the source image in one-to-one. The model generating unit 111 also performs a process to find an initial value of the ordinary differential equation. The model generating unit 111 generates the image matching state transition model in advance and stores the same in a storage medium such as a memory prior to an operation of the numerical analyzing unit 112 which finds the correspondence between respective points in the source image and the points in the destination image.

The numerical analyzing unit 112 is a processor which analyzes the ordinary differential equation representing the image matching state transition model created by the model generating unit 111 from an initial value thereof based on a numerical analysis using Euler's method, and finds the correspondence between the respective points in the source image and the points in the destination image, to output the found correspondence to the scale converting unit 120. Generally, numerical analyzing process by The numerical analyzing unit 112 is called descrete variable method.

As shown in FIG. 1, the numerical analyzing unit 112 includes a potential energy calculator 151 which calculates a term of a force $F_u$ ($=u(q_i)$) of the potential energy in the ordinary differential equation representing the image matching state transition model, a elastic force calculator 152 which calculates a term of a elastic force $F_k$ ($=k(q_i)$) in the ordinary differential equation, and a friction force calculator 153 which calculates a term of a friction force $F_\mu$($=\mu(dq_i/dt)$) in the ordinary differential equation. The numerical analyzing unit 112, by performing the calculation of respective forces at the potential energy calculator 151, the elastic force calculator 152, and the friction force calculator 153, solves the ordinary differential equation representing the image matching state transition model, thereby finding the correspondence between the respective points in the source image and the points in the destination image.

The scale converting unit 120 is a processor which performs a scale conversion of the correspondence between the respective points in the source image and the points in the destination image found by the image matching processing unit 110 according to a desired position, to output the result to the motion compensating unit 130. This result means a mapping between the respective points in the source image and the points in the destination image.

The motion compensating unit 130 is a processor which performs motion compensation based on the mapping between the respective points in the source image and the points in the destination image after the scale conversion by the scale converting unit 120, the source image, and the destination image, to generate a compensated image which is a new image for a desired position.

The frame memory 140 is a memory which temporarily stores an image stream, the source image, the destination image or the compensated image which is supplied as an input to the motion compensating unit 100.

Figure 2:
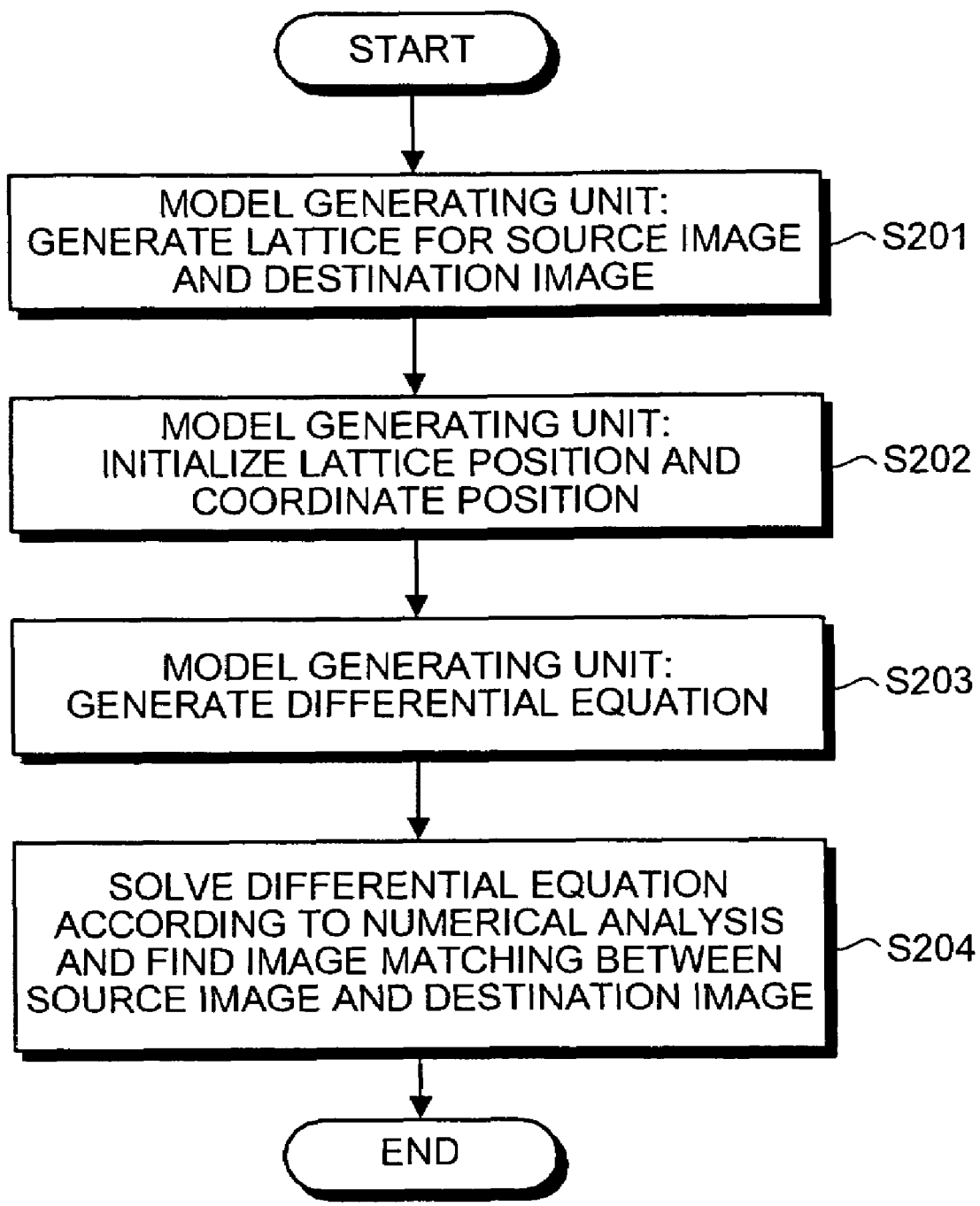
FIG. 2 is a flowchart of a process sequence of a generation of the image matching state transition model and a process sequence of an image matching process.

Next, the generation of the image matching state transition model by the motion compensating apparatus with the above-described structure according to the first embodiment is described. FIG. 2 is a flowchart of a process sequence of the generation of the image matching state transition model and a process sequence of the image matching.

First, the model generating unit 111 selects the source image and the destination image from the input image stream to generate lattice points of the source image and the destination image (step S201). Then, the model generating unit 111 initializes respective lattice points and coordinate positions (step S202). Further, the model generating unit 111 generates a differential equation of the image matching state transition model described later (step S203). The differential equation, which will be described later in detail, is referred to as:

$$\ddot{q}_i = u(q_i) + k(q_i) - \mu \dot{q}_i \qquad (17)$$

The image matching according to the image matching state transition model thus generated is described next. Here, a meaning of "generate" contains "give scalars and constant terms to the predetermined differential equation of the image matching state transition model.

The numerical analyzing unit 112 solves the ordinary differential equation of Equation (17) representing the image matching state transition model generated by the model generating unit 111 (step S204). Specifically, the potential energy calculator 151 calculates the term of the force $\mu(q_i)$ of the potential energy in Equation (17), the elastic force calculator 152 calculates of the term of the elastic force $k(q_i)$ of Equation (17), and the friction force calculator 153 calculates the term of the friction force $\mu(dq_i/dt)$ in Equation (17), whereby the ordinary differential equation (17) is solved. Further in step S204, the correspondence between the respective points in the source image and the points in the destination image is found (step S204). The found correspondence is supplied to the scale converting unit 120 as an output. The solution of the ordinary differential equation (17) is described later.

Next, the principle of the generation of the ordinary differential equation at the step S203 in the image matching process, i.e., the principle of the generation of the image matching state transition model is described. Here in the first embodiment, the image is viewed as to include pixel values arranged like lattice points. The image matching process to find the correspondence between two images is equivalent to treating one of two images as a source image P and another of two images as a destination image Q, and finding which point on the source image corresponds with which point on the destination image.

Here, the lattice points on the source image are denoted as $i = (i,j)^T$ where $i = 0$ to $M-1$, $j = 0$ to $N-1$, and a point on the destination image that corresponds with the point i is denoted by $q_i$. Then, the relation between the point i on the source image and the point $q_i$ on the destination image can be represented as a mapping relation of Equation (1):

$$q_i = f(i) \tag{1}$$

The image matching process is reduced to finding a mapping f.

Figure 3:
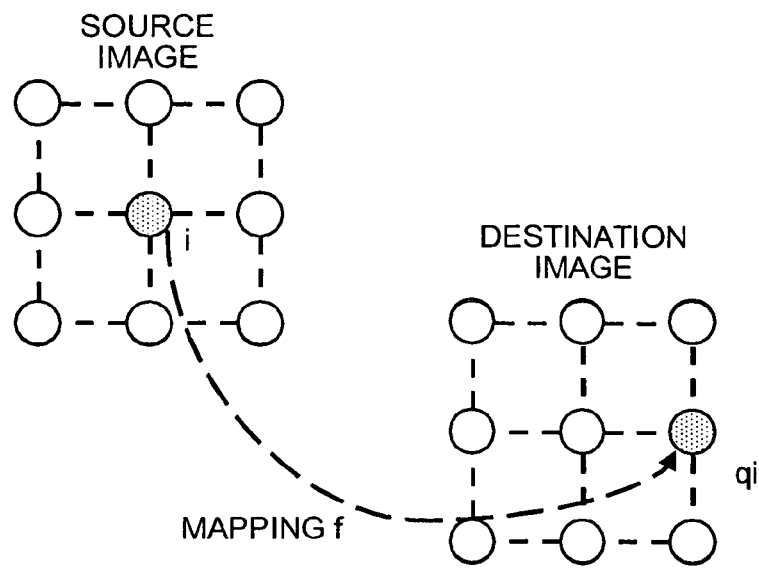
FIG. 3 is an explanatory diagram of a mapping relation between a point i in a source image and a point $q_i$ in a destination image.
Figure 4:
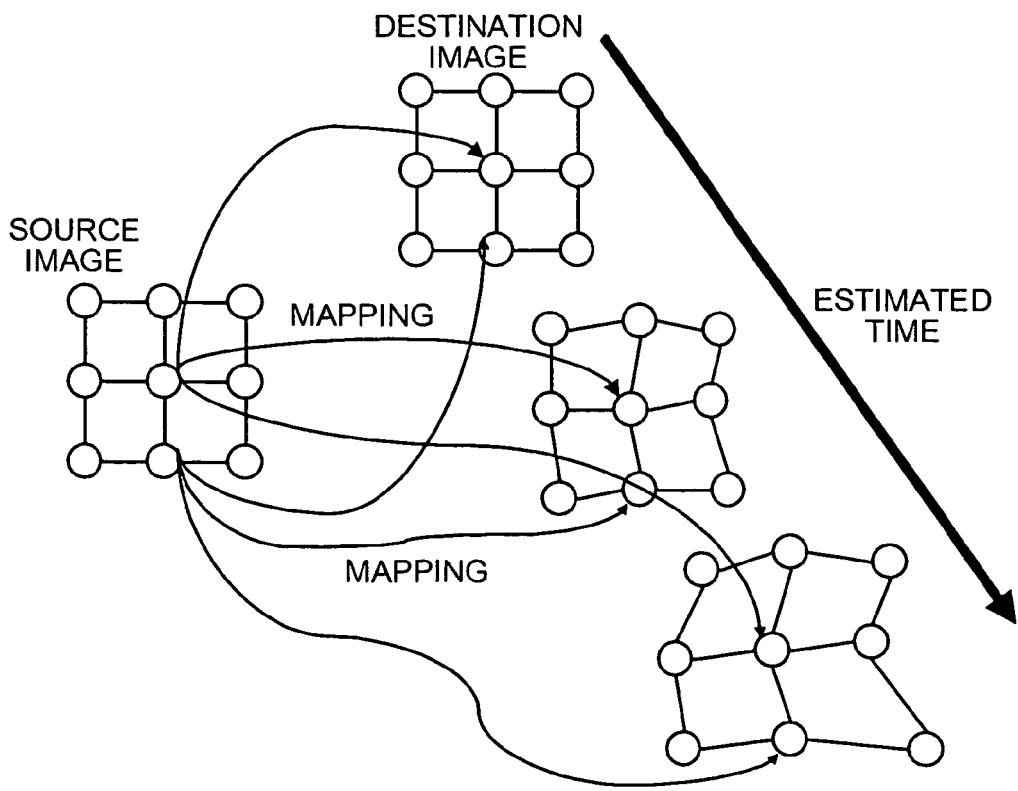
FIG. 4 is an explanatory diagram of a change over time of the mapping relation between the point i in the source image and the point $q_i$ in the destination image.

FIG. 3 is an explanatory diagram of the mapping relation between the point i on the source image and the point $q_i$ on the destination image. FIG. 4 is an explanatory diagram of a change over time of the mapping relation between the point i on the source image and the point $q_i$ on the destination image. Here, the pixel value of the source image and the pixel value of the destination image are denoted as $I_P(i)$ and $I_Q(q_i)$ respectively. In the first embodiment, the image matching problem is viewed as a dynamic state transition model. In other words, as shown in FIG. 4, each point $q_i$ is viewed as a mass point in a dynamic system, and a state transition model (dynamic system) is described with the mass point treated as a state, and a convergence value of the state is regarded as an estimate value of the mapping.

First, each point $q_i$ is viewed as a mass point in a dynamic system, and an equation of motion is found for $q_i$ based on a force applied on the mass point. Here, provided that the pixel value does not change between corresponding lattice points on the source image and the destination image, the smaller difference between $I_P(i)$ and $I_Q(q_i)$ means a closer matching. Hence, a model is introduced here based on an assumption that potential energy is generated by the difference between $I_P(i)$ and $I_Q(q_i)$ and a force created by the potential energy works on each point $q_i$. Here, the force by the potential energy is defined by Equation (2):

$$F_u = u(q_i) \tag{2}$$

Figure 5:
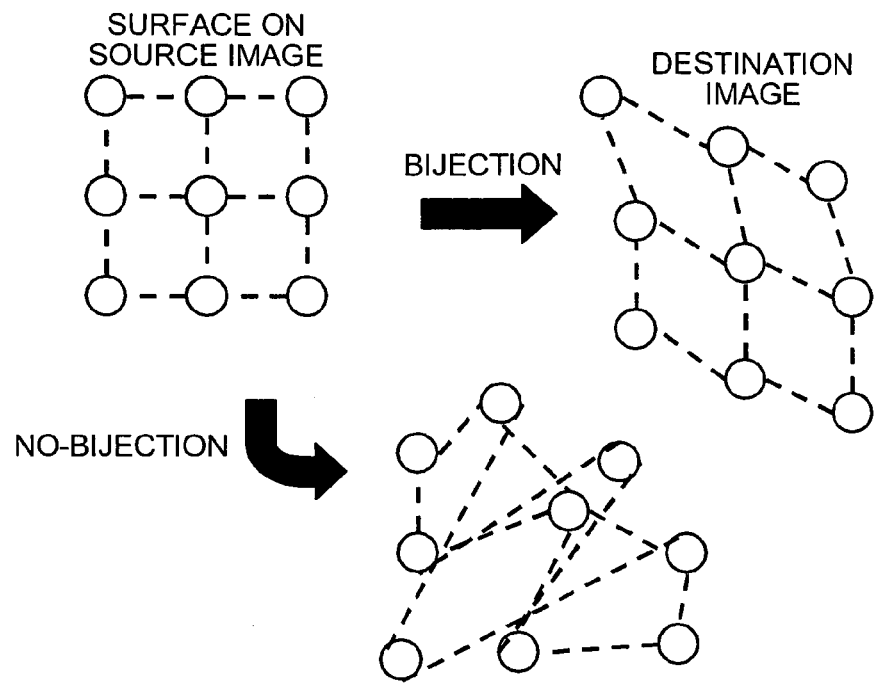
FIG. 5 is an explanatory diagram of examples where the mapping is bijective and non-bijective, respectively.

When the relation between respective points is considered, correlation between points in images is extremely high in horizontal and vertical directions. Hence, a certain area of the source image is expected to entirely correspond to a certain area of the destination image. In addition, when the image is a two-dimensional projection of three-dimensional space as in the image picked up by a conventional camera, a certain surface of the source image corresponds to another surface of the destination image. In other words, when a certain surface of the source image is in a lattice-like shape, such lattice-like relation of the surface is maintained in a surface of the destination image. Such mapping is referred to as bijective. FIG. 5 is an explanatory diagram of examples of bijective mapping and non-bijective mapping.

As shown in FIG. 5, for the creation of the bijective mapping model, respective points $q_i$ are connected by a spring-like structure through formation of an equation of motion which causes elastic force to be applied between the respective points $q_i$.

When respective points $q_i$ are simply connected without the application of the elastic force, though the bijective nature of the mapping is satisfied, the source image cannot be transformed, resulting in a significant constraint on possible estimated mapping. Hence, the model which causes elastic force to work between respective points is created to allow for the description of transforming mapping. When the transformation causes distortion to disrupt the bijective nature of the mapping, the force of the potential energy of the spring is expected to work to restore the mapping into an original lattice shape, i.e., to satisfy the bijective nature of the mapping. The force of the potential energy with such a spring-like elastic force is defined by Equation (3):

$$F_u = k(q_i) \tag{3}$$

According to Equations (1), (2), and (3), the equation of motion for respective point $q_i$ of the destination image is represented as Equation (4):

$$m\ddot{q}_i = F_u + F_k \tag{4}$$

Here, the equation of motion as represented by Equation (4) produces the solution which permanently oscillates and does not converge. For example, when an example of an equation of motion for a one-dimensional pendulum is considered based on an assumption that the potential is generated by a gravitational field, the equation of motion can be represented by Equation (5):

$$\ddot{x} = g - \frac{k}{m}x \tag{5}$$

Through the transform of Equation (5), Equation (6) which is a linear differential equation can be obtained.

$$\ddot{x} + \frac{k}{m}x = g \tag{6}$$

The linear differential equation as Equation (6) can be analytically solved in a following manner and the Laplace transform of Equation (6) produces Equation (7):

$$(s^2 X(s) - sx_0 - \dot{x}_0) + \frac{k}{m}X(s) = \frac{g}{s} \tag{7}$$

$$X(s) = \frac{x_0 s + \dot{x}_0}{s^2 + \omega^2} + \frac{g}{s(s^2 + \omega^2)}$$

where $$\omega = \sqrt{\frac{k}{m}}$$

$x_0$ = initial value of position

-continued $\dot{x}_0$ = initial velocity of position

With an inverse Laplace transform of Equation (7), an analytical solution of the differential equation, i.e., Equation (8) can be obtained:

$$x = \left(x_0 - \frac{g}{\omega^2}\right)\cos\omega t + \frac{\dot{x}_0}{\omega}\sin\omega t + \frac{g}{\omega^2} \quad (8)$$

Equation (8), which represents an oscillating state, permanently oscillates as is clear from the absence of the attenuation term.

Hence, when a friction relating with the velocity is assumed to work on the one-dimensional oscillator due to some factor, and a term relating with the friction is introduced into the equation, the energy is not stored and can be converged to zero. The state where energy is zero means that there is no energy to cause oscillation of the oscillator, i.e., that the oscillation is stopped. When the friction term is added to Equation (5), Equation (5) can be transformed into Equation (9):

$$\ddot{x} = g - \frac{k}{m}x - \frac{\mu}{m}\dot{x} \quad (9)$$

Through transform of Equation (9), Equation (10) can be obtained:

$$\ddot{x} + \frac{\mu}{m}\dot{x} + \frac{k}{m}x = g \quad (10)$$

A Laplace transform of Equation (10) produces Equation (11):

$$X(s) = \frac{g}{s(s+\alpha)^2} + \frac{x_0 s}{(s+\alpha)^2} + \frac{\dot{x}_0 + (\mu/m)x_0}{(s+\alpha)^2} \quad (11)$$

Thus, the analytical solution of Equation (9) can be represented by Equation (12):

$$x = \frac{g}{\alpha^2}(1 - e^{-\alpha t} - \alpha t e^{-\alpha t}) + x_0 e^{-\alpha t}(1 - \alpha t) + \left(\dot{x}_0 + \frac{\mu}{m}\right)t e^{-\alpha t} \quad (12)$$

Here, the value −a is a limit of the system and if the limit is set so that the value t is infinite in Equation (12), Equation (13) is obtained:

$$\lim_{t \to \infty} x = \frac{g}{\alpha^2} \quad (13)$$

From Equation (13), it is known that the model represented by Equation (9) will converge to $g/\alpha^2$ regardless of the initial value.

Thus, similarly to the addition of the friction term into the model of the equation of motion of the oscillator, the friction term is added to the model of the equation of motion for the image matching so as to produce a converged value.

The friction force can be represented by Equation (14):

$$F_\mu = -\mu \dot{q}_i \quad (14)$$

where $\dot{q}_i$ is the velocity of $q_i$
$\mu(\geq 0)$ is friction factor when the velocity of the system is sufficiently low.

When the friction term of Equation (14) is added to Equation (4), the equation of motion for respective point $q_i$ of the destination image can be represented as Equation (15):

$$m\ddot{q}_i = F_u + F_k + F_\mu \quad (15)$$

With the substitution of Equations (2), (3), and (14) into Equation (15), a equation of motion as represented by Equation (16) can be obtained:

$$m\ddot{q}_i = u(q_i) + k(q_i) - \mu\dot{q}_i \quad (16)$$

Here, provided that mass of the point $q_i$ is m=1, an equation of motion as represented by Equation (17) can be obtained:

$$\ddot{q}_i = u(q_i) + k(q_i) - \mu\dot{q}_i \quad (17)$$

The model represented by Equation (17) is formulated so that the respective point $q_i$ is treated as a mass point, and the potential energy of respective mass point decreases according to the potential generated by the gradient of pixel value. The model of Equation (17) serves as a differential equation for finding a map f which would reduce changes of pixel values between respective points between two images, i.e., the source image and the destination image.

The model generating unit 111 of the image matching processing unit 110 extracts two images, i.e., the source image and the destination image from the input image stream and generates a model of ordinary differential equation as represented by Equation (17) for the extracted two images.

Next, the force $u(q_i)$ of the potential energy of the pixel gradient in Equation (17) is described. In the first embodiment, the potential is defined as a plane vector generated by the luminance gradient on a target point. The force $u(q_i)$ of the potential energy is a vector pointing a direction where the descent of the luminance gradient is sharpest. The vector is defined so that the sharper luminance gradient creates a larger vector so that the applied force increases at the sharper luminance gradient.

When the force $u(q_i)$ of the final potential energy is normalized according to the inter-pixel distance, Equation (18) can be obtained:

$$u(q_i) = \frac{|I_Q(q_i + u_d) - I_Q(q_i)|}{\|u_d\|} u_d \quad (18)$$

$$u_d = q_{\min} - q_i$$

$$q_{\min} = \arg\min_{q_{loc} \in \Omega} |I_P(i) - I_Q(q_{loc})|$$

where O represents space representing peripheral ten points including $q_i$.

Figure 6:
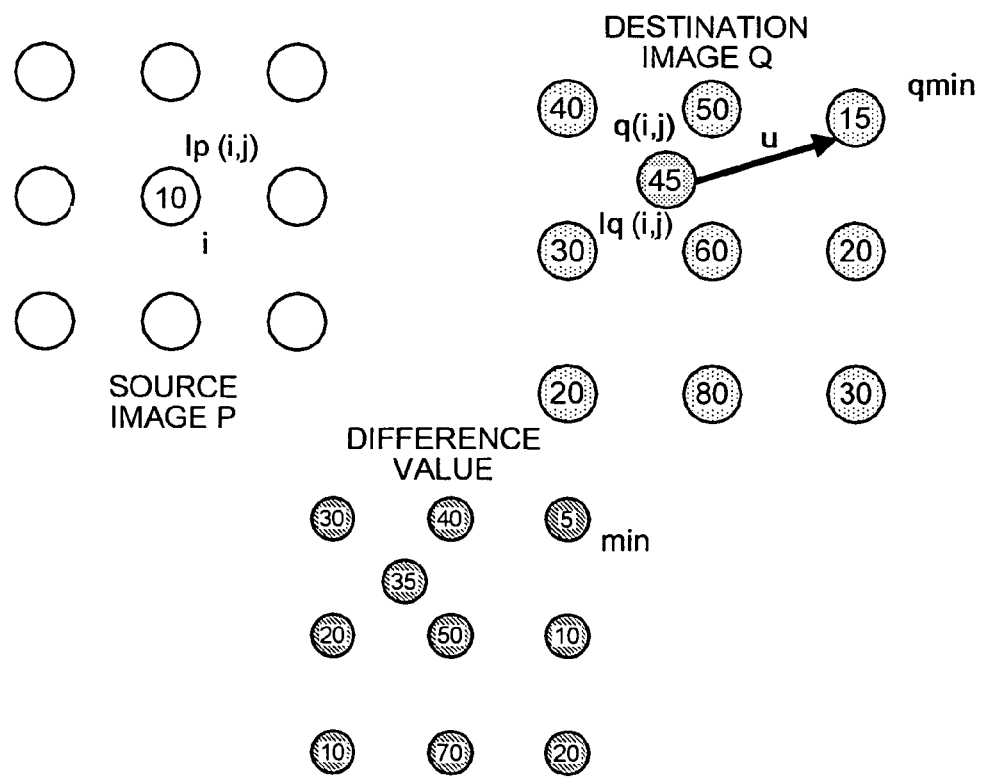
FIG. 6 is an explanatory diagram of working of potential force $u(q_i)$ generated by luminance gradient.

FIG. 6 is an explanatory diagram of a function of the force $u(q_i)$ of the potential of the luminance gradient as represented by Equation (18). As shown in FIG. 6, the force u of the potential points toward a direction of the sharpest descent of the luminance gradient.

Figure 7:
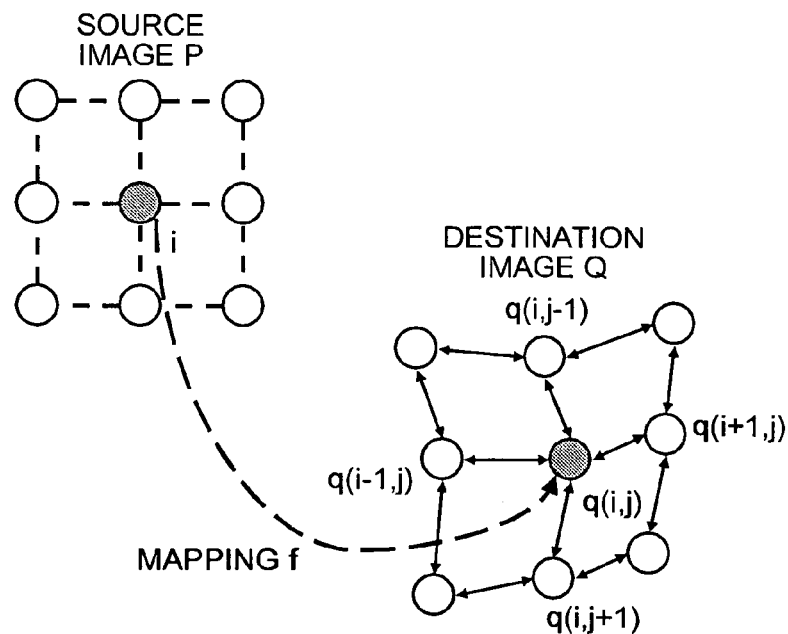
FIG. 7 is an explanatory diagram of a model where adjacent lattice points in the source image and the destination image, respectively, are viewed as being connected via springs, and elastic force is generated between respective lattice points.

Next, the elastic force $k(q_i)$ of Equation (17) is described. FIG. 7 is an explanatory diagram representing a model created based on an assumption that the adjacent lattice points of the source image and the destination image are connected by springs to generate elastic force which works between respective lattice points. In the model as shown in FIG. 7, adjacent four points, i.e., an upper right point, an upper left point, a lower right point, and a lower left point, are assumed to be connected.

Figure 8:
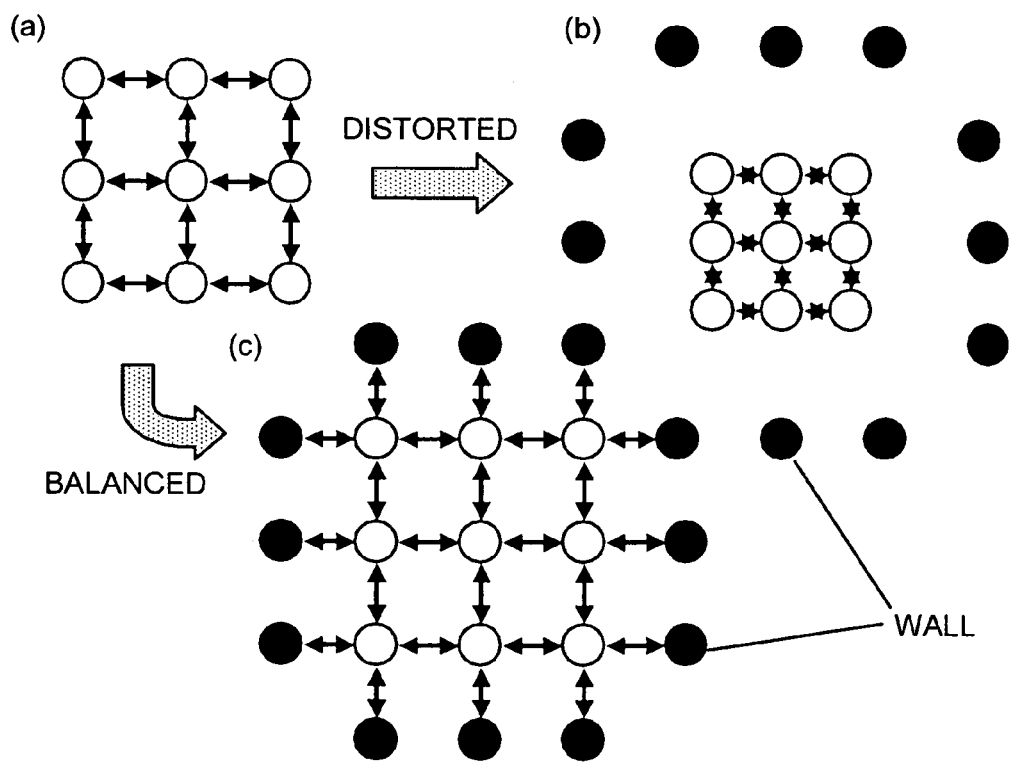
FIG. 8 is an explanatory diagram of a state of a elastic force which works on each lattice point.

FIG. 8 is an explanatory diagram of a state of the elastic force working on each lattice point. In the model, the spring is assumed to be in equilibrium when the length of the spring is zero. In other words, a force is applied to the spring according to the displacement thereof when the spring extends. Hence, the elastic force always works as to retract the spring back to the zero length. As shown by (b) of FIG. 8, respective lattice points are pulled to the center to distort the shape formed by lattice points. Hence, the lattice points located at the periphery of the image are virtually connected to a wall surface as shown in (c) of FIG. 8 according to the first embodiment. Virtual wall surfaces are supposed to exist around the lattice points and the wall surfaces located above, below, to the right and to the left of the lattice points are connected to the lattice points. Thus, the force applied to the lattice points is adjusted so that overall equilibrium can be achieved. Thus, the distortion of the shape formed by the lattice points can be prevented. The elastic force $k(q_i)$ of the model generated by the connection of the lattice points to the virtual wall surfaces can be represented by Equation (19):

$$k(q_i)=k(q_{i-(0,1)}{}^T-q_i)+k(q_{i-(1,0)}{}^T-q_i)+k(q_{i+(1,0)}{}^T-q_i)+k(q_{i+(1,0)}{}^T-q_i) \qquad (19)$$

where k is a constant of spring.

Thus, the model generating unit 111 generates the equation of motion represented by the differential equation of Equation (17), defines the force $u(q_i)$ of the potential of the luminance gradient in Equation (17) by Equation (18), and defines the elastic force by Equation (19), thereby creating the image matching state transition model.

Figure 9:
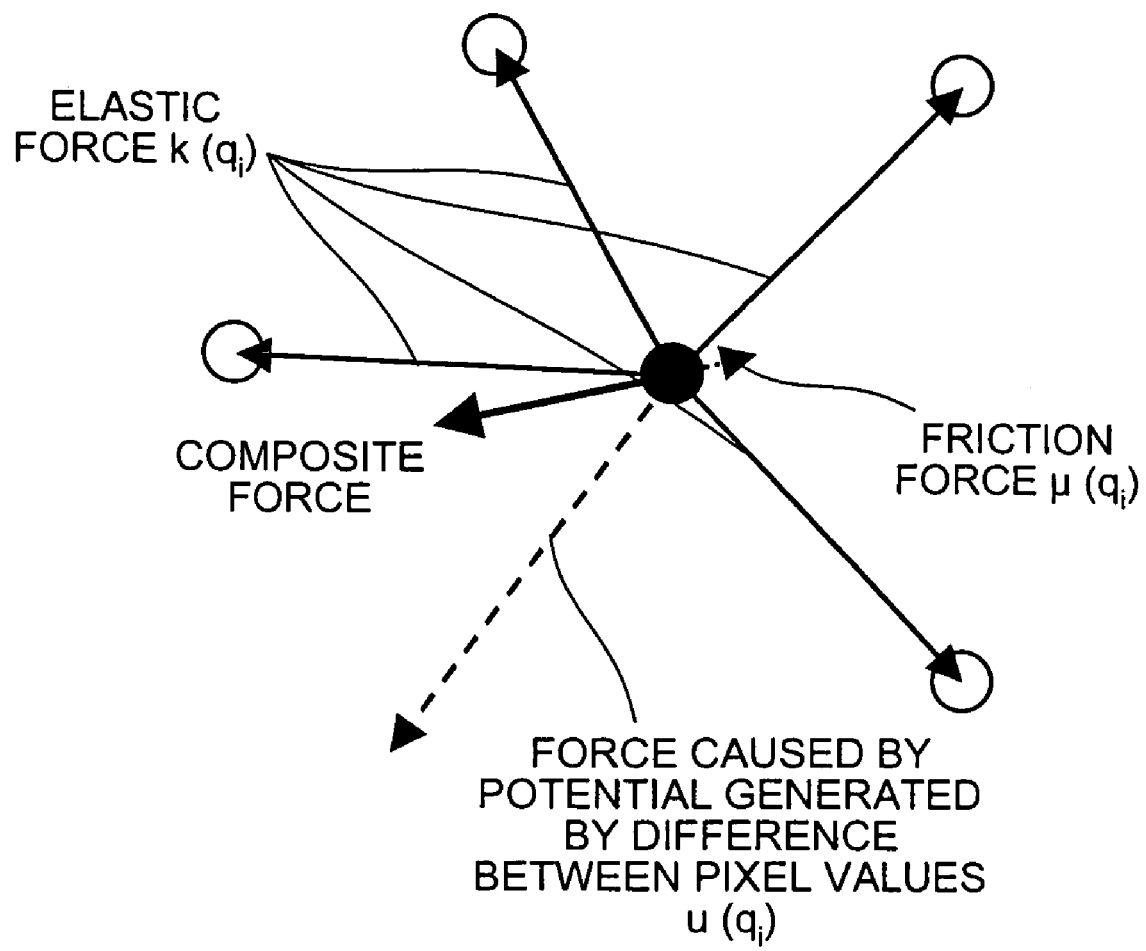
FIG. 9 is an explanatory diagram of forces which work on each lattice point of an image according to the image matching state transition model.
Figure 12A:
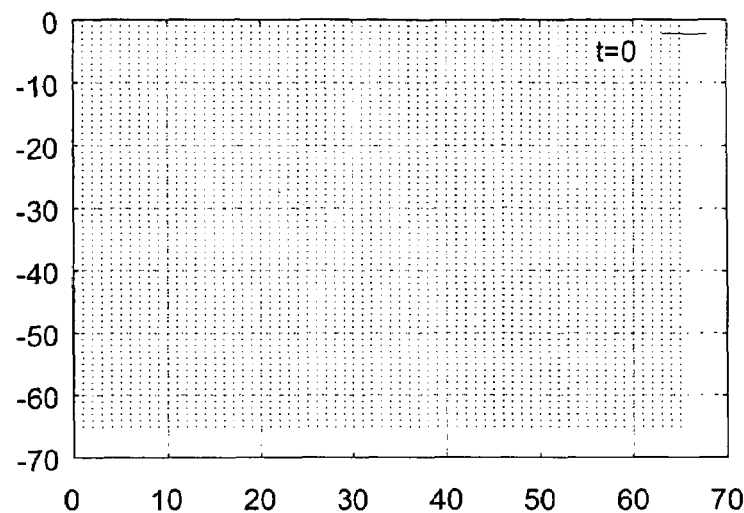
FIG. 12A is an explanatory diagram of a result of simulation of the destination image where corresponding points in the source image are reflected.
Figure 12B:
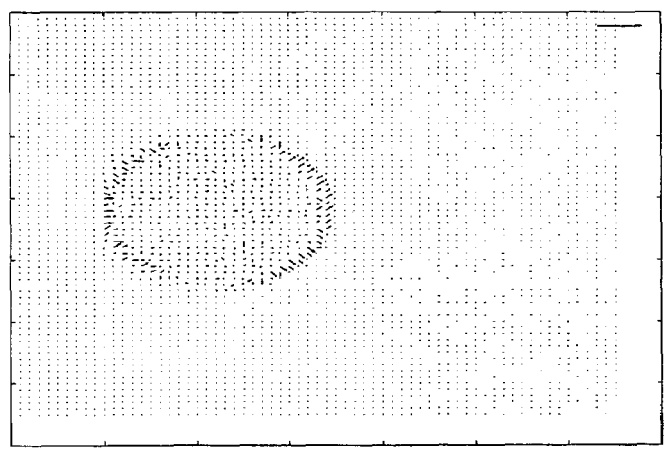
FIG. 12B is an explanatory diagram of a result of simulation of the destination image where corresponding points in the source image are reflected.
Figure 12C:
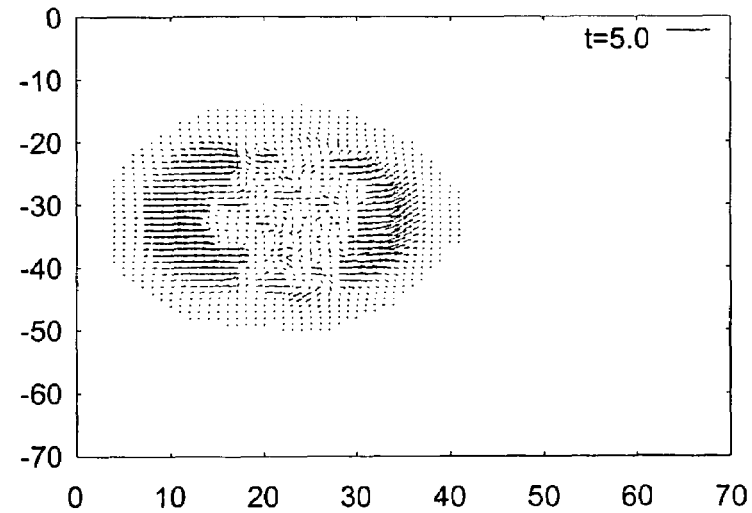
FIG. 12C is an explanatory diagram of a result of simulation of the destination image where corresponding points in the source image are reflected.
Figure 12D:
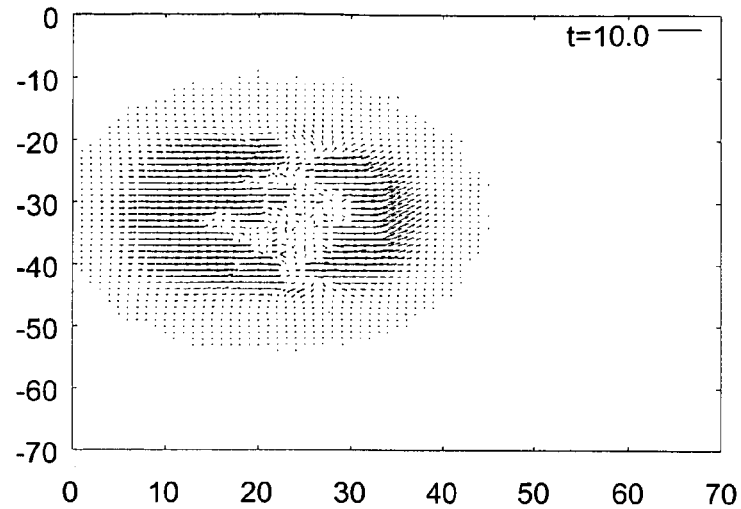
FIG. 12D is an explanatory diagram of a result of simulation of the destination image where corresponding points in the source image are reflected.
Figure 12E:
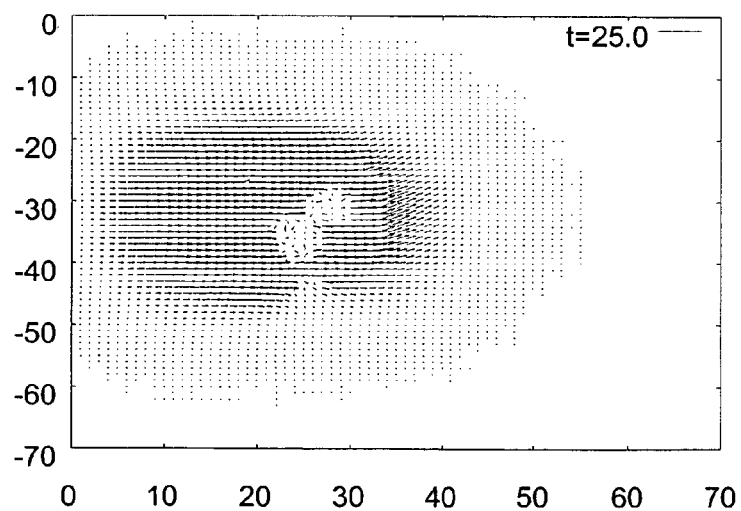
FIG. 12E is an explanatory diagram of a result of simulation of the destination image where corresponding points in the source image are reflected.
Figure 12F:
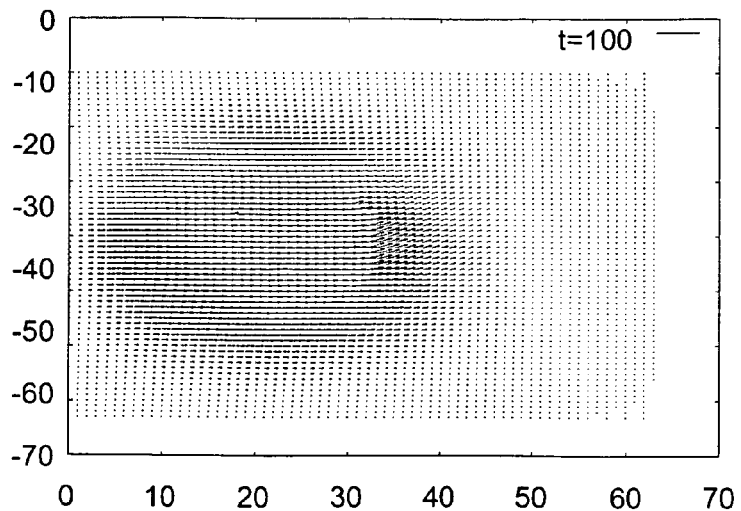
FIG. 12F is an explanatory diagram of a result of simulation of the destination image where corresponding points in the source image are reflected.

FIG. 9 is an explanatory diagram of forces that work on each lattice point of the image in the image matching state transition model. As shown in FIG. 9, the force $u(q_i)$ of the potential of the luminance gradient, the elastic force $k(q_i)$, and the friction force $\mu(q_i)$ work on each lattice point. The convergence value of the composite force of these three forces is an estimated result of the map f.

Next, the process of solution of the ordinary differential equation represented by Equation (17) by the numerical analyzing unit 112 of the image matching processing unit 110 will be described.

As described above, in Equation (17), respective points are connected to receive a elastic force so as to allow for the transformation from the source image to the destination image. In addition, the attenuation term representing the friction force is added to the expression for the convergence of the system. With the addition of such friction term, the energy is consumed as to allow for the convergence of the system to a predetermined value at the limit of infinite time t. The numerical analyzing unit 112 calculates such convergence value as the result of estimate of the map f.

Specifically, the numerical analyzing unit 112 analyzes the ordinary differential equation represented as Equation (17) via the numerical analysis, sets sufficiently long time T as time t to allow for the convergence of the system, and calculates the value in time period t=(0,T), to obtain the convergence value which is treated as the result of estimate of the map f.

The numerical solution of the ordinary differential equation as Equation (17) is a solution of a first-order simultaneous equation.

In other words, if variants are defined as represented by Equation (20), Equation (17) can be represented as a first-order simultaneous equation represented by Equation (21):

$$\text{Variant} \begin{cases} x_{1i} = q_i \\ x_{2i} = \dot{q}_i \end{cases} \qquad (20)$$

$$\begin{cases} \dot{x}_{1i} = x_{2i} \\ \dot{x}_{2i} = u(x_{1i}) + k(x_{1i}) - \mu x_{2i} \end{cases} \qquad (21)$$

where variant $(x_{1i}, x_{2i})^T$ are position and velocity of $q_i$

The numerical analyzing unit 112 solves such first-order simultaneous equation utilizing the Euler's method. The formula of the Euler's method can be represented by Equation (22):

$$x^{(n+1)}=x^{(n)}+hF(x^{(n)},t) \qquad (22)$$

Equation (22) unfolds the solution from $t^{(n)}$ to $t^{(n+1)}=t^{(n)}+h$. Here, $x^{(n)}$ means n iteration. When the Euler's method is applied to Equation (21), an update equation of the ordinary differential equation according to the Euler's method is obtained as Equation (23):

$$\begin{cases} x^{(n+1)}{}_{1i} = x^{(n)}{}_{1i} + hx^{(n)}{}_{2i} \\ x^{(n+1)}{}_{2i} = x^{(n)}{}_{2i} + h(u(x^{(n)}{}_{1i}) + k(x^{(n)}{}_{1i}) - \mu x^{(n)}{}_{2i}) \end{cases} \qquad (23)$$

The solution according to the Euler's method is as follows. FIG. 10 is a flowchart of a process sequence of solution of the ordinary differential equation by the numerical analyzing unit 112.

First, initial values are set as $x^{(0)}{}_{1i}=i$, and $x^{(0)}{}_{2i}=0$, where i=0 to M−1, j=0 to N−1 (step S1001).

Then, at a time $t^{(n)}$, values for a subsequent step, i.e., n+1$^{th}$ step are calculated as $x^{(n+1)}{}_{1i}=i$, and $x^{(n+1)}{}_{2i}=0$ (where i=0 to M−1, j=0 to N−1) according to the update equation represented by Equation (24) (step S1002):

$$\begin{cases} x^{(n+1)}{}_{1i} = x^{(n)}{}_{1i} + hx^{(n)}{}_{2i} \\ x^{(n+1)}{}_{2i} = x^{(n)}{}_{2i} + h(u(x^{(n)}{}_{1i}) + k(x^{(n)}{}_{1i}) - \mu x^{(n)}{}_{2i}) \end{cases} \qquad (24)$$

$$i = 0, \ldots, M-1; \quad j = 0, \ldots, N-1$$

Here, the calculation of $u(x^{(n)}{}_{1i})$ is performed by the potential energy calculator 151, the calculation of $k(x^{(n)}{}_{1i})$ is performed by the elastic force calculator 152, and the calculation of $\mu x^{(n)}{}_{2i}$ is performed by the friction force calculator 153.

Then, based on $t^{(n+1)}=t^{(n)}+h$ (step S1003), it is determined whether $t^{(n+1)}$ is larger than T or not (step S1004) If $t^{(n+1)}>T$ (Yes in step S1004), the process ends, whereas if $t^{(n+1)} \leq T$ (No in step S1004), the calculation of the update equation of Equation (22) and the processing of $t^{(n+1)}=t^{(n)}+h$ are repeated until $t^{(n+1)}>1$ holds. Here, since $q_i=x^{(n+1)}$, the map can be found according to Equation (25):

$$x^{(n+1)}{}_{1i}=f(i) \qquad (25)$$

FIG. 11 is an explanatory diagram of a change in an image employed in a first simulation. In the first simulation, an object of the source image shown on the left side of the diagram moves to the left by two pixels in the destination image shown on the right side of the diagram.

The simulation of the image matching according to the first embodiment is performed on such a source image and a destination image. The results of the simulation are shown in FIGS. 12A to 12F.

Figure 13:
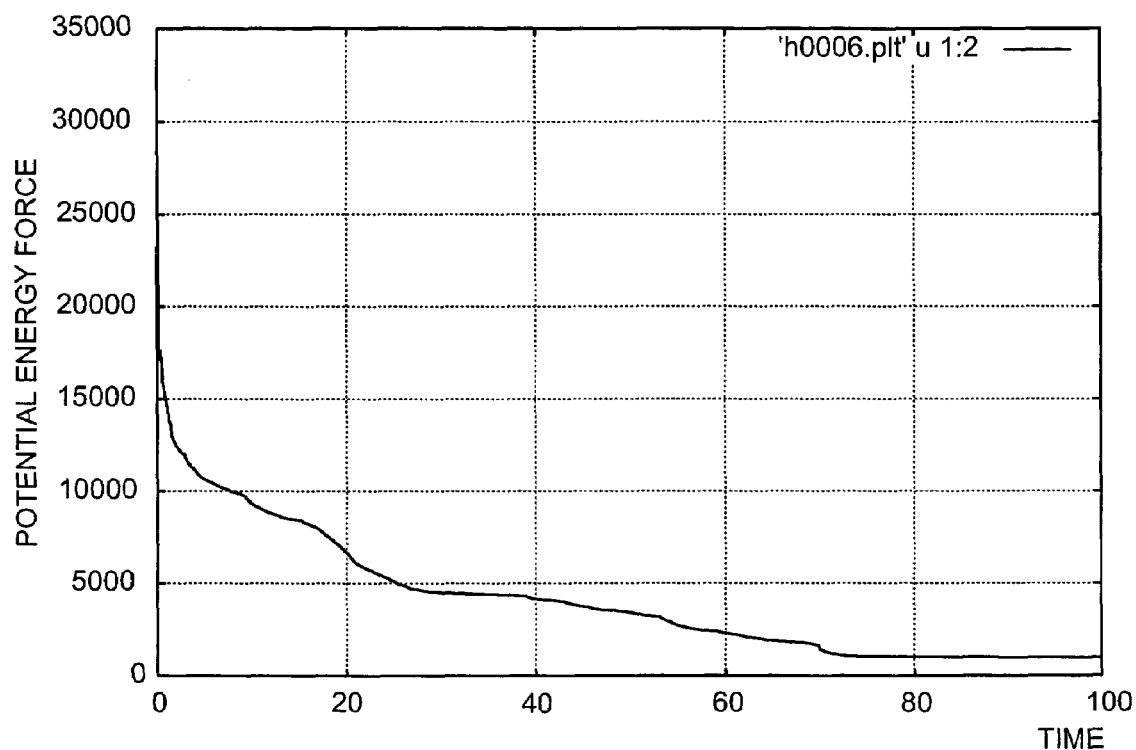
FIG. 13 is a graph of a potential energy force u of a pixel value in the first simulation against time.

FIGS. 12A to 12F are explanatory diagrams of the results of simulation of the destination image where corresponding points in the source image are reflected. It is assumed that time t elapses according to the order of the sequence of FIGS. 12A to 12F. As shown in FIGS. 12A to 12F, the motion of the object comes to be more closely matched as the estimated time elapses. FIG. 13 shows a change over time of the force u of the potential energy of the pixel value at the first simulation. As shown in FIG. 13, it can be confirmed that the force u of the potential energy converges from a peak to a valley of the pixel gradient.

Figure 14:
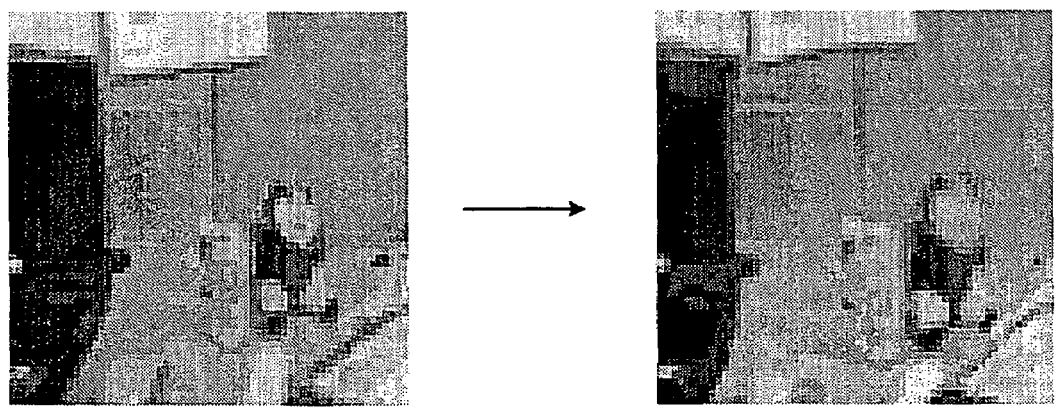
FIG. 14 is an explanatory diagram of a change in an image employed in a second simulation.
Figure 15A:
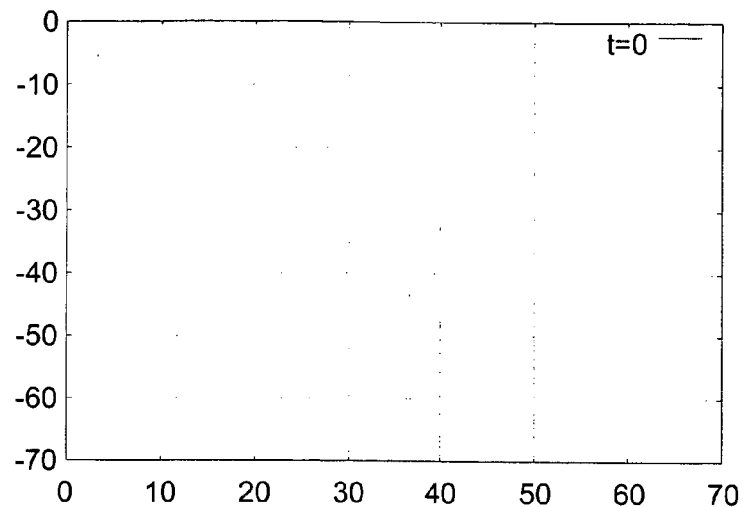
FIG. 15A is an explanatory diagram of a result of simulation of the destination image where corresponding points in the source image are reflected.
Figure 15B:
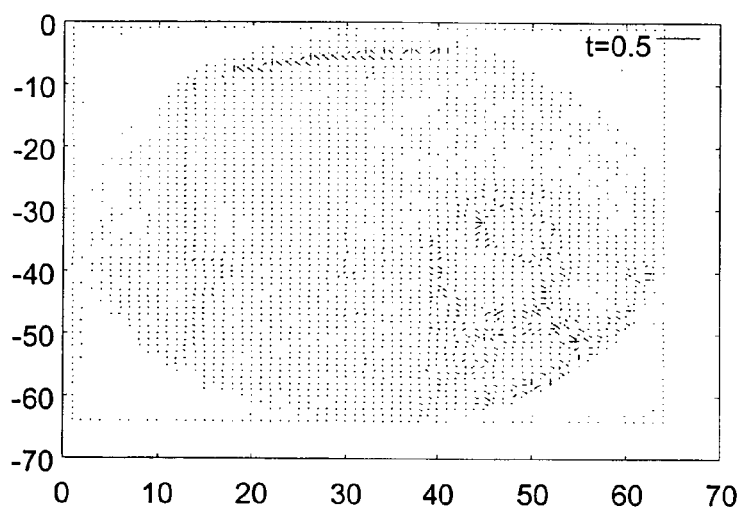
FIG. 15B is an explanatory diagram of a result of simulation of the destination image where corresponding points in the source image are reflected.
Figure 15C:
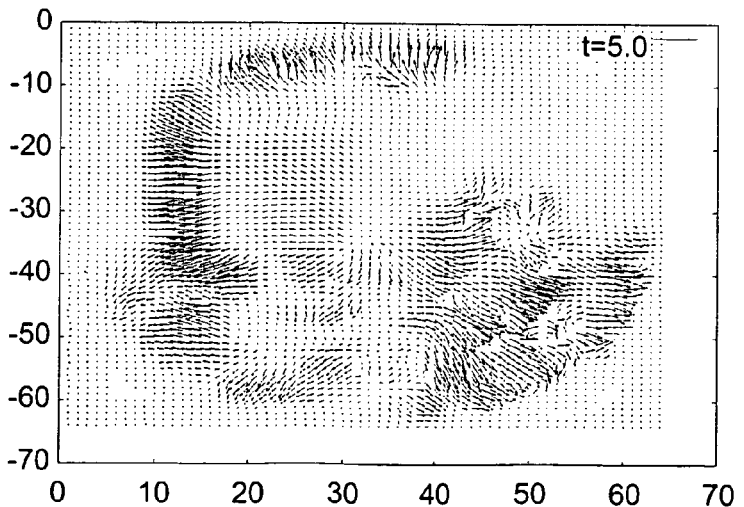
FIG. 15C is an explanatory diagram of a result of simulation of the destination image where corresponding points in the source image are reflected.
Figure 15D:
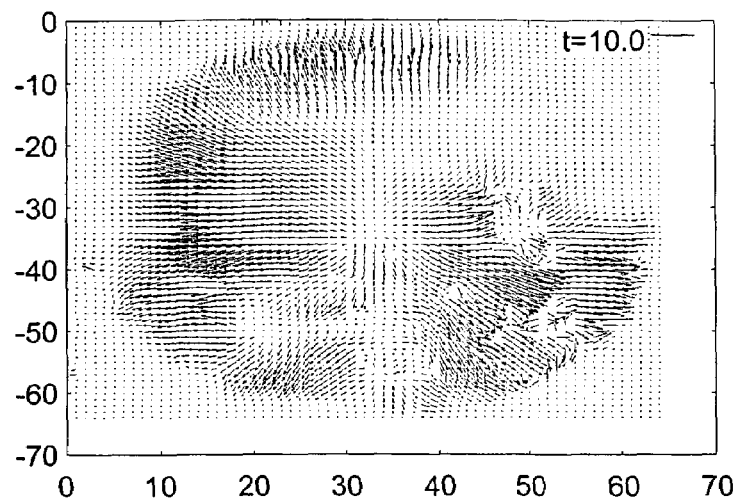
FIG. 15D is an explanatory diagram of a result of simulation of the destination image where corresponding points in the source image are reflected.
Figure 15E:
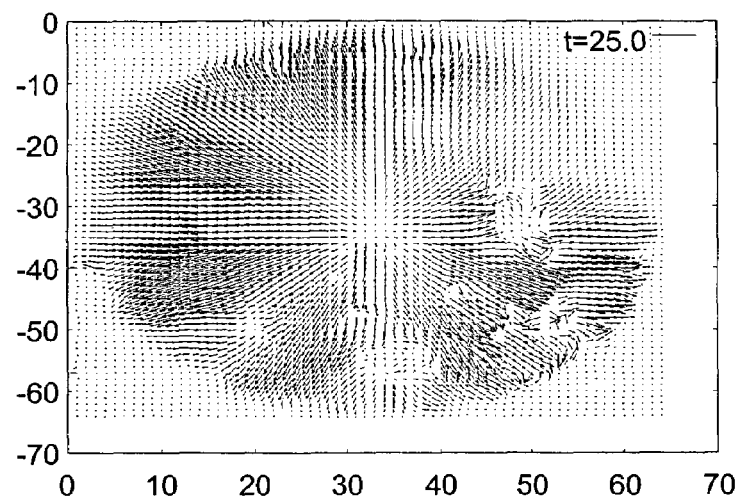
FIG. 15E is an explanatory diagram of a result of simulation of the destination image where corresponding points in the source image are reflected.
Figure 15F:
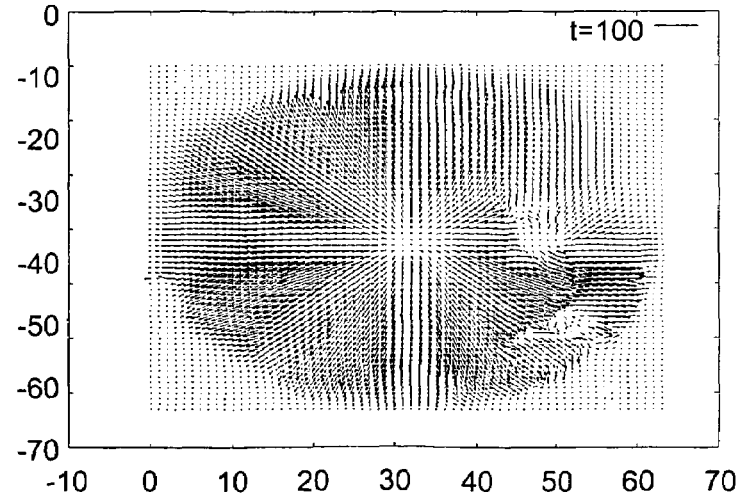
FIG. 15F is an explanatory diagram of a result of simulation of the destination image where corresponding points in the source image are reflected.

FIG. 14 is an explanatory diagram of a change of an image employed in a second simulation. In the second simulation, an object of the source image shown on the left side of the diagram is enlarged to the destination image shown on the right side of the diagram.

The simulation of the image matching according to the first embodiment is performed on such a source image and a destination image. The results of the simulation are shown in FIGS. 15A to 15F.

Figure 16:
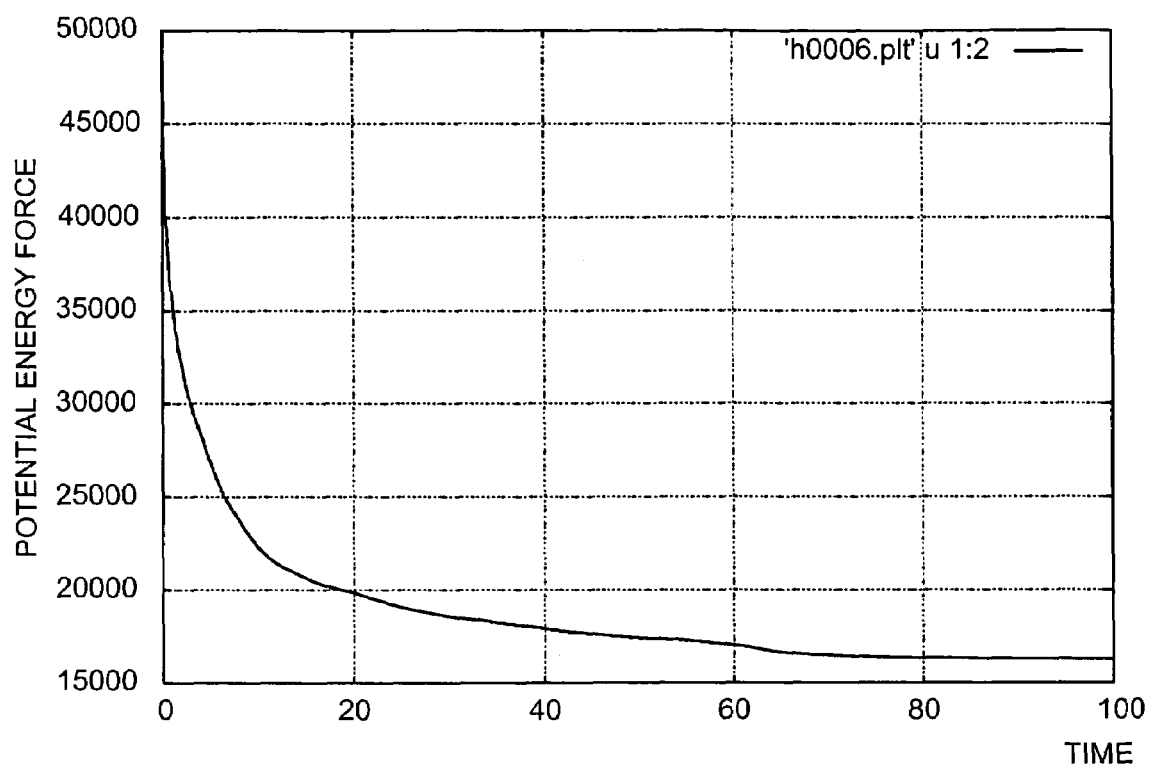
FIG. 16 is a graph of potential energy force of a pixel value in the second simulation against time.

FIGS. 15A to 15F are explanatory diagrams of the results of simulation of the destination image where the corresponding points in the source image are reflected. The time t elapses according to the order of the sequence of FIGS. 15A to 15F. As shown in FIGS. 15A to 15F, respective pixels match with the motion caused by the enlargement. FIG. 16 shows a change over time of the potential energy of the pixel value in the second simulation. As shown in FIG. 16, it can be confirmed that the potential energy converges from a peak to a valley of the pixel gradient.

Thus, according to the image matching by the motion compensating apparatus according to the first embodiment, the image matching is viewed as a dynamic state transition model, in other words, the respective lattice point $q_i$ is viewed as a mass point in a dynamic system, the state transition model is described with respective lattice point viewed as a state, and the convergence value of the state is treated as the estimated value of the map. Thus, the highly robust and highly precise image matching can be realized at a pixel level with a simple structure and process.

Second Embodiment

Next, a second embodiment will be described.

In the motion compensating apparatus according to the first embodiment, the state transition model is formulated based on the force of the potential energy of the luminance gradient of only a single pixel at each lattice point. Hence, when the target pixel contains the noise component, the potential space becomes complicated to cause distortion resulting in a longer time for the convergence of the model.

Hence, in a motion compensating apparatus according to the second embodiment, a target is set as a block consisting of plural pixels for the generation of the image matching state transition model. When the block consisting of plural pixels is set as the target of the model according to the second embodiment, the improvement in the robustness of the apparatus can be realized similarly to the block matching method.

The functional structure of the motion compensating apparatus according to the second embodiment is similar to the apparatus according to the first embodiment. In addition, the overall process of image matching is performed similarly to the first embodiment described with reference to FIG. 2.

According to the second embodiment, the model generating unit 111 sets the force $u(q_i)$ of the potential according to Equation (26) to generate the image matching state transition model of Equation (17), and the numerical analyzing unit 112 solves the ordinary differential equation represented as Equation (17). Here, the numerical analyzing unit 112 solves Equation (17) similarly to the first embodiment, and Equation (26) is employed for finding the force $u(q_i)$ of the potential energy of the pixel gradient.

$$u(q_i) = \frac{|I_Q(q_i + u_d) - I_Q(q_i)|}{\|u_d\|} u_d \quad (26)$$

$$u_d = q_{\min} - q_i$$

$$q_{\min} = \arg\min_{q_{1oc} \in \Omega} \frac{1}{N_B} \sum_{w \in B} |I_P(i+w) - I_Q(q_{1oc} + w)|$$

Here, B is a block as an operation target consisting of plural pixels around a target pixel. The character $N_B$ denotes the number of pixels in the block B.

The numerical analyzing unit 112 solves the ordinary differential equation represented by Equation (17), in which the force $u(q_i)$ of the potential is determined according to Equation (26), similarly to the first embodiment.

Thus, in the motion compensating apparatus according to the second embodiment, since the block consisting of plural pixels is set as the target of the image matching state transition model, the improvement in robustness can be realized even when the noise component is added to the target pixel.

Third Embodiment

Next, a third embodiment is described.

In the motion compensating apparatus according to the first or the second embodiment, the image matching state transition model works according to the force of the potential of the pixel gradient at each lattice point. Hence, when the pixel gradient is not properly generated, for example, when the motion of the image is rough, the system of the image matching state transition model as represented by Equation (17) does not converge to a desired equilibrium position, thereby sometimes failing to realize an appropriate image matching.

Hence, in a motion compensating apparatus according to the third embodiment, downsampling is performed on the source image and the destination image plural times in a spatial direction, to generate hierarchical structures of the images. The processing is implemented sequentially from the upper layer to the lower layer of the hierarchical structures.

The functional structure of the motion compensating apparatus according to the third embodiment is similar to that of the first embodiment.

Figure 17:
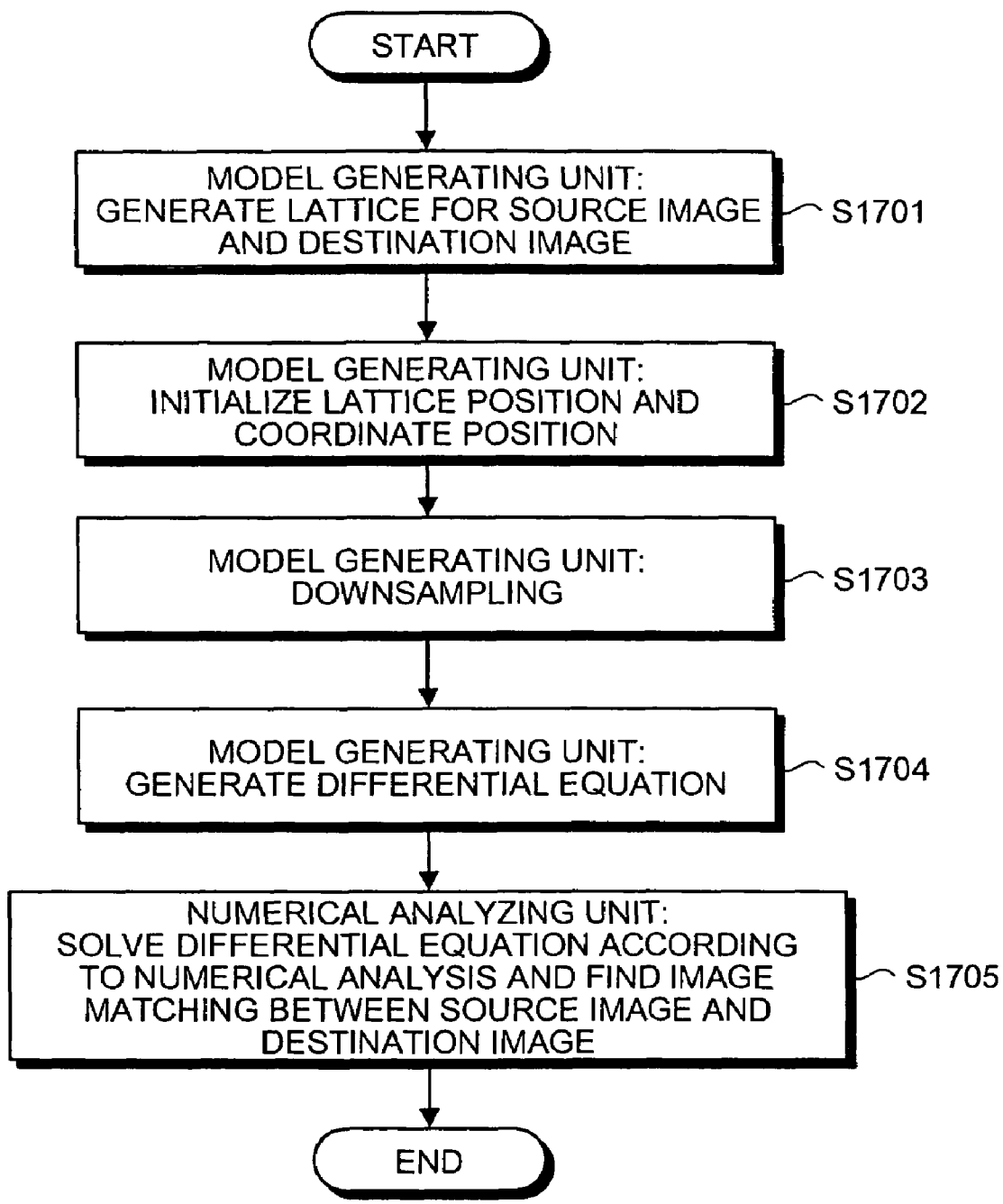
FIG. 17 is a flowchart of a process sequence of the image matching process.

Next, the image matching by the motion compensating apparatus 100 according to the third embodiment is described. FIG. 17 is a flowchart of a process sequence of the image matching.

First, the model generating unit 111 selects the source image and the destination image from an input image stream to generate lattice points of the source image and the destination image (step S1701). Then, the model generating unit 111 initializes respective lattice positions and coordinate positions (step S1702). The model generating unit 111 further implements the downsampling in the spatial direction on the source image and the destination image plural times (step S1703). Here, downsampling means to perform a sampling of pixels of a fixed size on the source image and the destination image to generate a sub-source image and a sub-destination image of a higher layer. For example, gaussian pyramid is a way method of downsampling. When downsampling is repeatedly performed to further extract pixels of a fixed size from the sub-source image and the sub-destination image, eventually plural layers of the sub-source image s and the sub-destination image s are generated.

Figure 18:
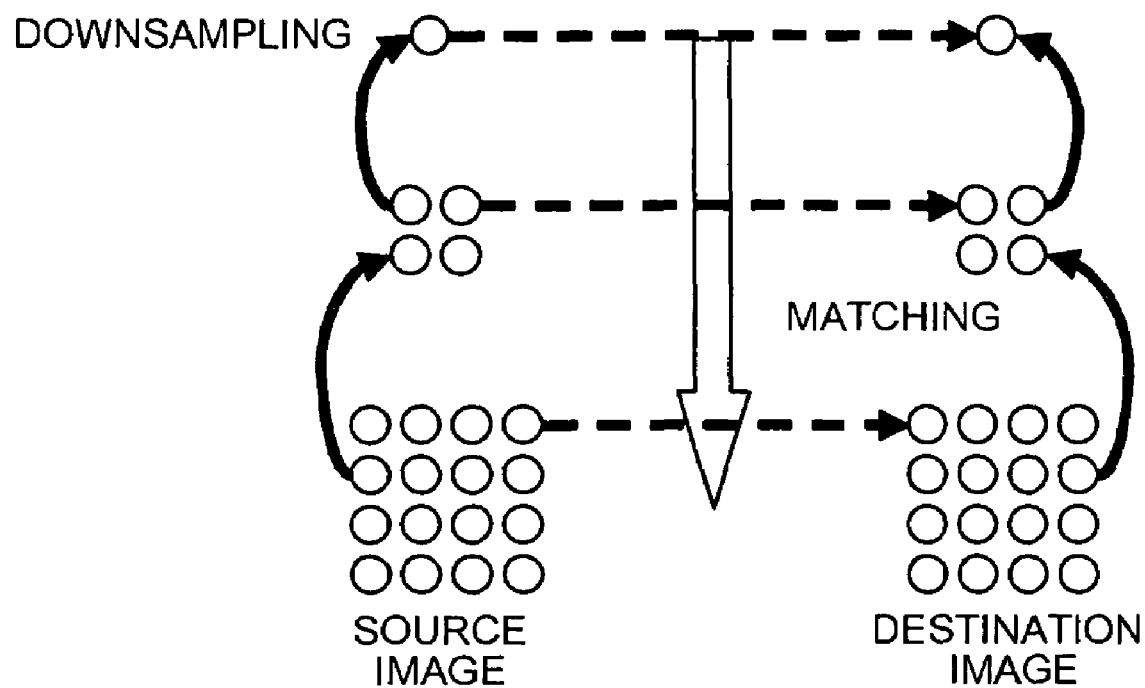
FIG. 18 is an explanatory diagram of a state of downsampling.

FIG. 18 is an explanatory diagram of a state of downsampling. As shown in FIG. 18, each of the original source image and the original destination image is subjected to sampling by ½ in vertical and horizontal directions, so as to create a hierarchical pyramid structure of the images where the number of pixels increases from the upper layer to the lower layer. Then, the image matching is performed for each layer. Here, though the original image is subjected to sampling by ½ both in horizontal and vertical directions, the ratio is not limited to ½.

Returning to FIG. 17, the model generating unit 111 generates a differential equation (as represented by Equation (28)) of the image matching state transition model similarly to the first embodiment (step S1704).

According to the third embodiment, the model generating unit 111 generates the image matching state transition model as follows.

First, the image size is set to $2^M$ both in the vertical and the horizontal directions. The lattice point of the source image is set as follows.

$i=(i,j)^T$, where $i=0$ to $2^m-1$, $j=0$ to $2^m-1$, $m=0$ to M.

When the downsampling is performed in a spatial direction so as to sample the original image by ½ both in vertical and horizontal directions, the resulting hierarchical pyramid structure can be represented as follows.

$i^{(m)}=(i,j)^T$, where $i=0$ to $2^m-1$, $j=0$ to $2^m-1$, $m=0$ to M.

When a point on the destination image corresponding to the lattice point $i^{(m)}$ in the pyramid structure is represented as $q_{i(m)}$, the mapping relation can be represented by Equation (27):

$$q_{i^{(m)}} = f^{(m)}(i^{(m)}) \quad (27)$$

Hence, the image matching state transition model for each layer can be represented by an ordinary differential equation (equation of motion) represented by Equation (28) similar to Equation (17) found in the first embodiment:

$$\ddot{q}_{i^{(m)}} = u(q_{i^{(m)}}) + k(q_{i^{(m)}}) - \mu \dot{q}_{i^{(m)}} \quad (28)$$

Here in the third embodiment an inter-layer constraint condition is introduced which is "a map of a higher layer is an initial value for a lower layer". However, another condition may be set as a constraint condition.

Then the numerical analyzing unit 112 solves the ordinary differential equation represented by Equation (17) as generated by the model generating unit 111, to find the correspondence between the respective points in the source image and the points in the destination image (step S1705). The found correspondence is supplied as an output to the scale converting unit 120.

Next, solution of the ordinary differential equation represented by Equation (28) by the numerical analyzing unit 112 in step S1705 is described. The Equation (28), similarly to Equation (17), converges at a predetermined value at a limit of infinite time t. The numerical analyzing unit 112 calculates the convergence value as a result of estimate of the map $f^{(m)}$.

Also in the third embodiment, the numerical analyzing unit 112 solves the ordinary differential equation represented as Equation (28) by the numerical analysis according to the Euler's method, where the time t is set to a sufficiently large value T for the convergence of the system and the convergence value obtained via the calculation for time period t=(0, T) is employed as the result of estimate of the map f.

Figure 19:
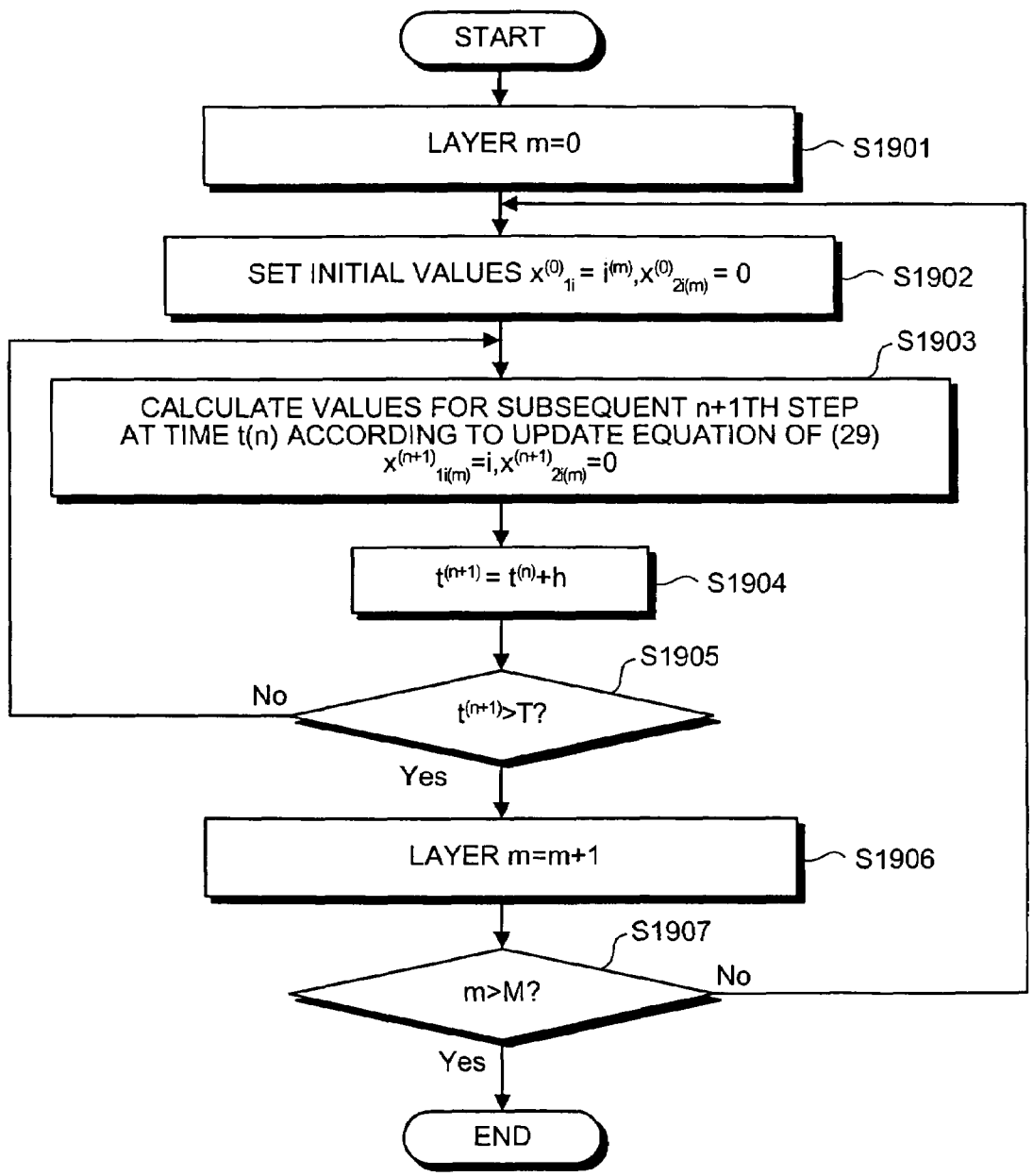
FIG. 19 is a flowchart of a process sequence of solution of an ordinary differential equation by the numerical analyzing unit 112.

FIG. 19 is a flowchart of a process sequence of solution of the ordinary differential equation by the numerical analyzing unit 112.

First, the target layer m of the image matching is initialized to zero (step S1901) and the initial values are set as $x^{(0)}_{1i(m)} = i^{(m)}$, $x^{(0)}_{2i(m)} = 0$, where $i=0$ to $2^m-1$, $j=0$ to $2^m-1$ (step S1902).

Then, values $x^{(n+1)}_{1i(m)} = i^{(m)}$, $x^{(n+1)}_{2i(m)} = 0$, where $i=0$ to $2^m-1$, $j=0$ to $2^m-1$ for a subsequent step, i.e., $n+1^{th}$ step are calculated at time $t^{(n)}$ according to the update equation represented by Equation (29) (step S1903):

$$\begin{cases} x^{(n+1)}_{1i(m)} = x^{(n)}_{1i(m)} + h x^{(n)}_{2i(m)} \\ x^{(n+1)}_{2i(m)} = x^{(n)}_{2i(m)} + h \left( u\left(x^{(n)}_{1i(m)}\right) + k\left(x^{(n)}_{1i(m)}\right) - \mu x^{(n)}_{2i(m)} \right) \end{cases} \quad (29)$$

$$i = 0, \ldots, 2^m - 1; \quad j = 0, \ldots, 2^m - 1$$

Here, the calculation of $u(x^{(n)}_{1i(m)})$ is performed by the potential energy calculator 151, the calculation of $k(x^{(n)}_{1i(m)})$ is performed by the elastic force calculator 152, and the calculation of $\mu x^{(n)}_{2i(m)}$ is performed by the friction force calculator 153.

Then, based on $t^{(n+1)} = t^{(n)} + h$ (step S1904), it is determined whether $t^{(n+1)}$ is larger than T or not (step S1905). When $t^{(n+1)} > T$ (Yes in step S1905), the layer m of the image matching target is increased by one for the transition to the processing of the lower layer (step S1906). On the other hand, when $t^{(n+1)} > T$ does not hold at step S1905, i.e., when $t^{(n+1)} \leq T$ (No in step S1905), the calculation of the update equation represented by Equation (29) and the processing for $t^{(n+1)} = t^{(n)} + h$ are repeatedly performed until $t^{(n+1)} > T$ holds. Here, since $q_i = x^{(n+1)}$, the map can be found according to Equation (27).

When the layer m of the image matching processing target is increased by one at step S1906, it is checked whether m is larger than M or not, i.e., whether the image matching is performed for all layers or not (step S1907). When the value of m is determined to be larger than M and the image matching processing has been performed for all layers (Yes in step S1907), the process ends. On the other hand, when m is smaller than M and the image matching processing has not been performed for all layers (No in step S1907), the image matching process from S1902 to S1906 is repeatedly performed for all layers.

Figure 20:
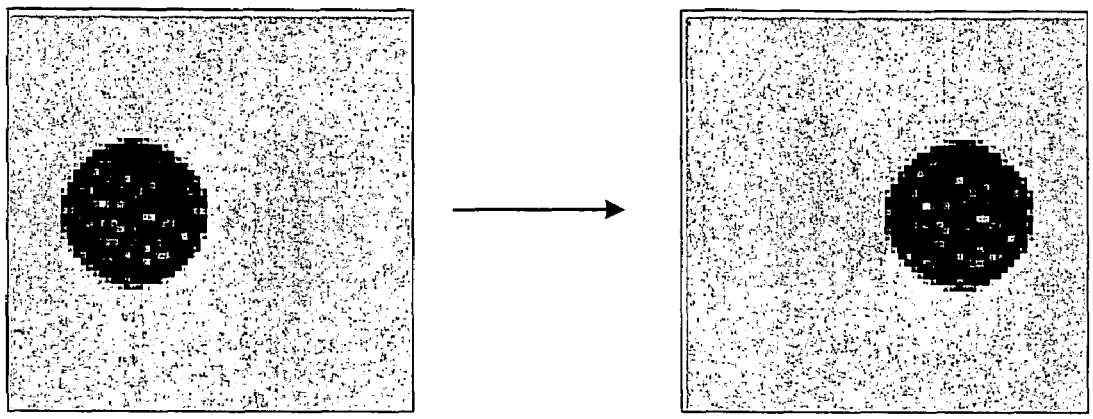
FIG. 20 is an explanatory diagram of a change in an image, which accompanies a motion with a large amount of displacement, employed in a simulation according to a third embodiment.
Figure 21A:
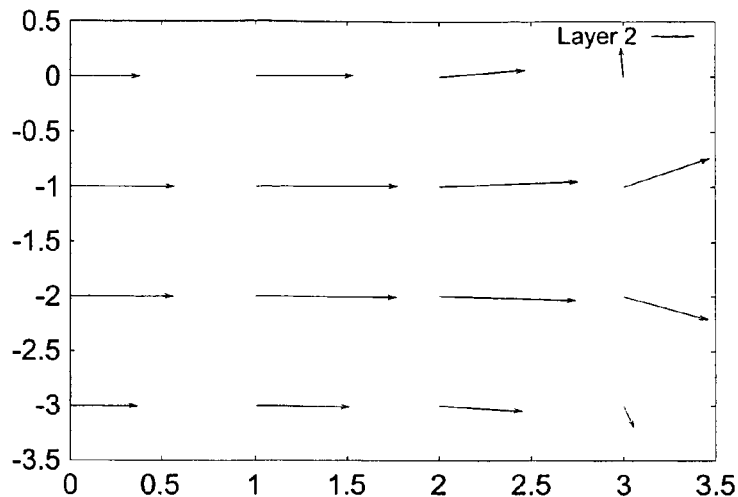
FIG. 21A is an explanatory diagram of a mapping of the destination image where corresponding points in the source image are reflected.
Figure 21B:
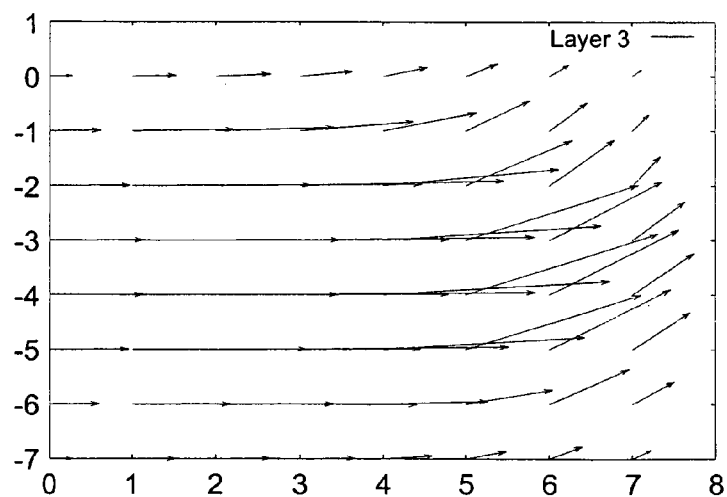
FIG. 21B is an explanatory diagram of a mapping of the destination image where corresponding points in the source image are reflected.
Figure 21C:
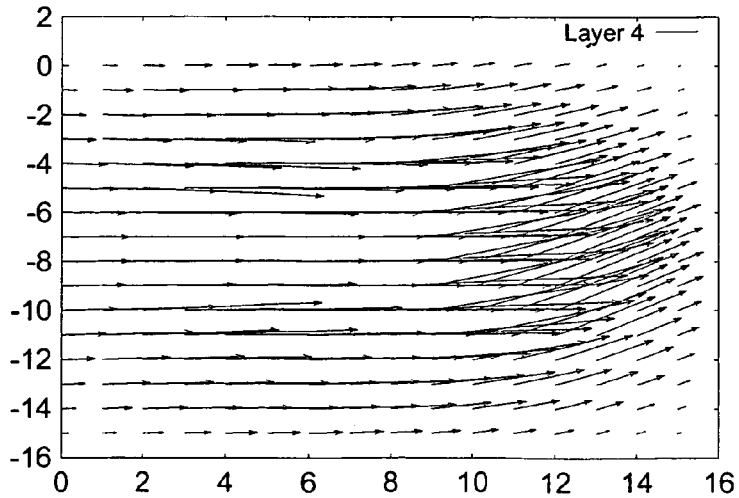
FIG. 21C is an explanatory diagram of a mapping of the destination image where corresponding points in the source image are reflected.
Figure 21D:
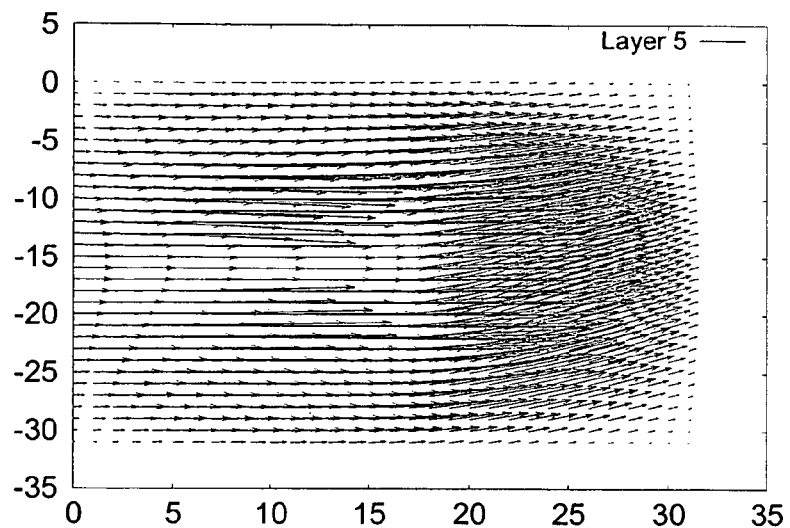
FIG. 21D is an explanatory diagram of a mapping of the destination image where corresponding points in the source image are reflected.
Figure 21E:
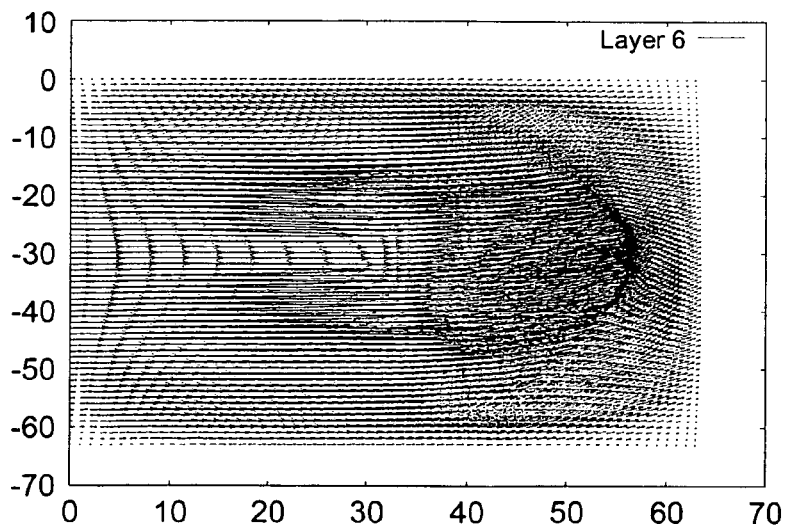
FIG. 21E is an explanatory diagram of a mapping of the destination image where corresponding points in the source image are reflected.
Figure 22A:
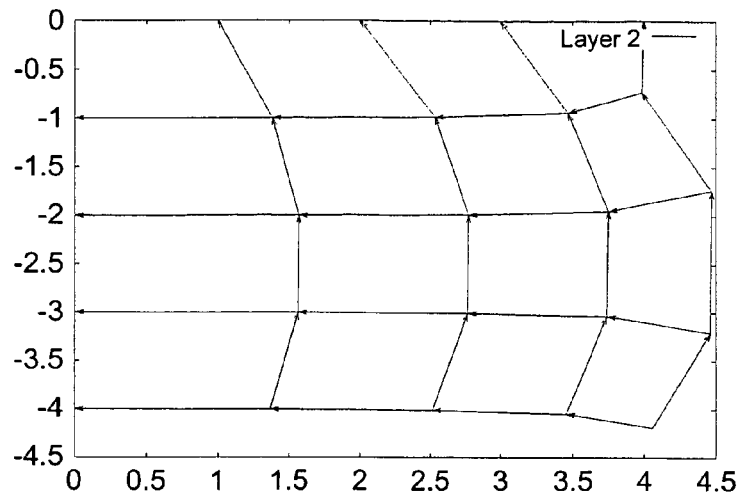
FIG. 22A is an explanatory diagram of a lattice map of the destination image where corresponding points in the source image are reflected.
Figure 22B:
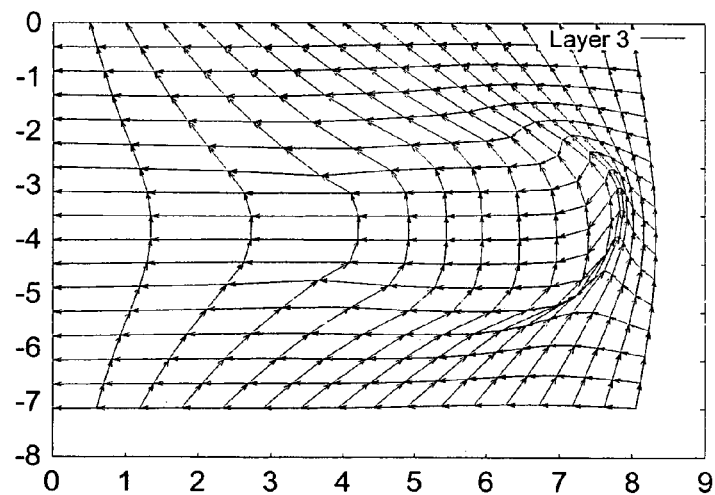
FIG. 22B is an explanatory diagram of a lattice map of the destination image where corresponding points in the source image are reflected.
Figure 22C:
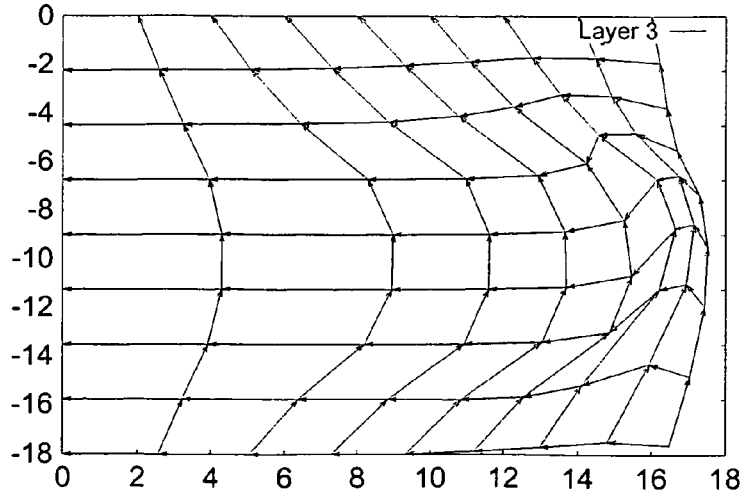
FIG. 22C is an explanatory diagram of a lattice map of the destination image where corresponding points in the source image are reflected.
Figure 22D:
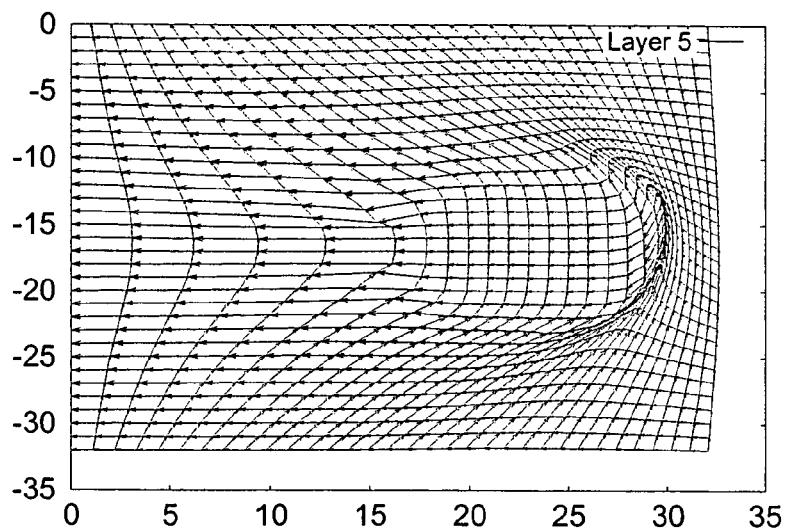
FIG. 22D is an explanatory diagram of a lattice map of the destination image where corresponding points in the source image are reflected.
Figure 22E:
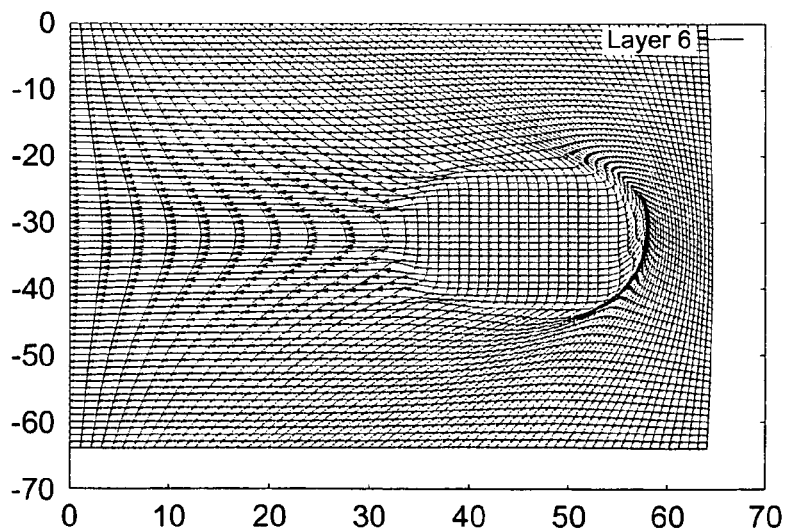
FIG. 22E is an explanatory diagram of a lattice map of the destination image where corresponding points in the source image are reflected.

FIG. 20 is an explanatory diagram of a change in an image with a large amount of displacement employed in simulation according to the third embodiment. In the simulation, an object of the source image shown on the left side of the diagram makes a movement with a large amount of displacement up to the destination image shown on the right side of the diagram.

The simulation of the image matching according to the third embodiment is performed for such a source image and a destination image. The results of simulation are shown in FIGS. 21A to 21E and FIGS. 22A to 22E.

FIGS. 21A to 21E are explanatory diagrams of mapping of the destination image where the corresponding points in the source image are reflected. FIGS. 21A to 21E represent mapping of layer 2 (Layer=2) to layer 6 (Layer=6) sequentially in this order. Further, FIGS. 22A to 22E are explanatory diagrams of lattice maps of the destination image where the corresponding points in the source image are reflected. FIGS. 22A to 22E represent lattice maps of layer 2 (Layer=2) to layer 6 (Layer=6) sequentially in this order. As shown in FIGS. 21A to 21E and FIGS. 22A to 22E, respective pixels correctly match with a motion with a large amount of displacement.

Figure 23:
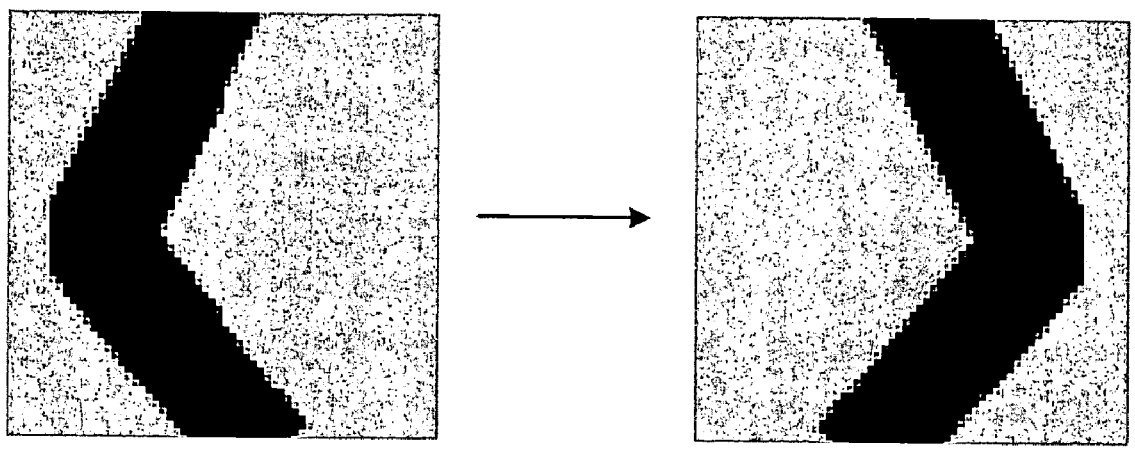
FIG. 23 is an explanatory diagram of a change in an image which is employed in a simulation according to the third embodiment, where motion such as inversion of an object occurs.
Figure 24A:
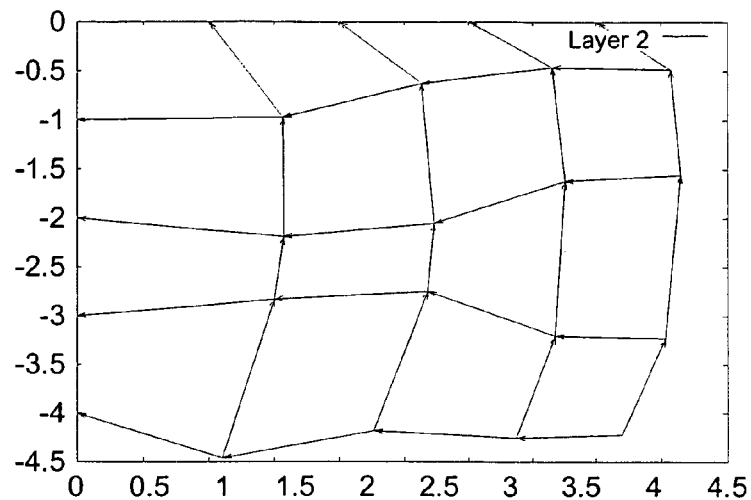
FIG. 24A is an explanatory diagram of a lattice map of the destination image where corresponding points in the source image are reflected.
Figure 24B:
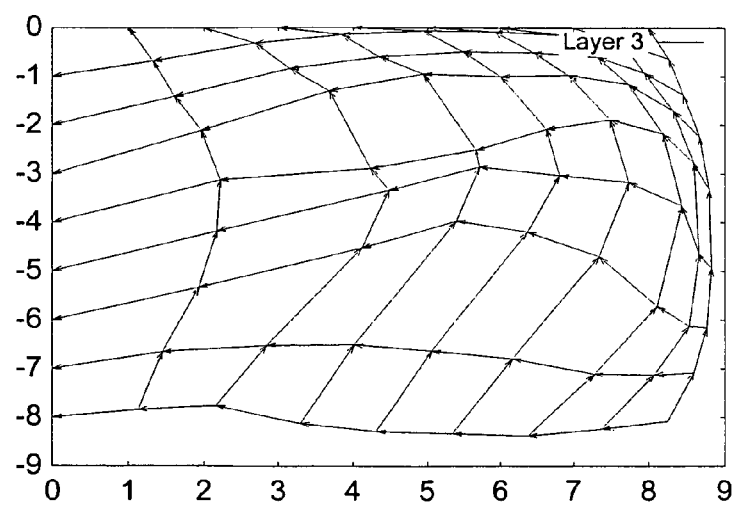
FIG. 24B is an explanatory diagram of a lattice map of the destination image where corresponding points in the source image are reflected.
Figure 24C:
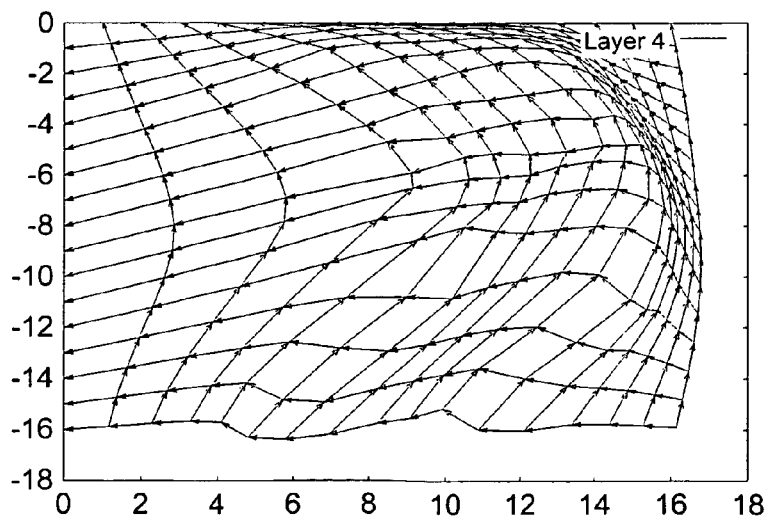
FIG. 24C is an explanatory diagram of a lattice map of the destination image where corresponding points in the source image are reflected.
Figure 24D:
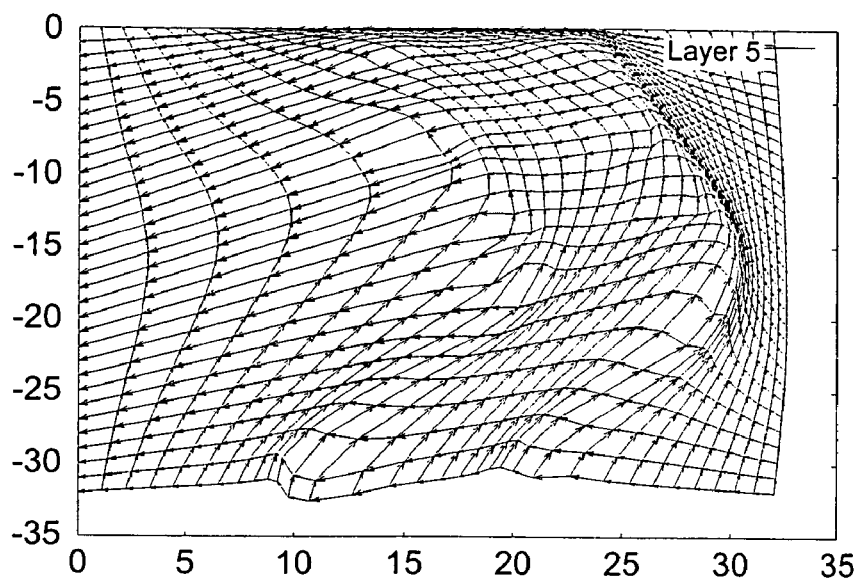
FIG. 24D is an explanatory diagram of a lattice map of the destination image where corresponding points in the source image are reflected.
Figure 24E:
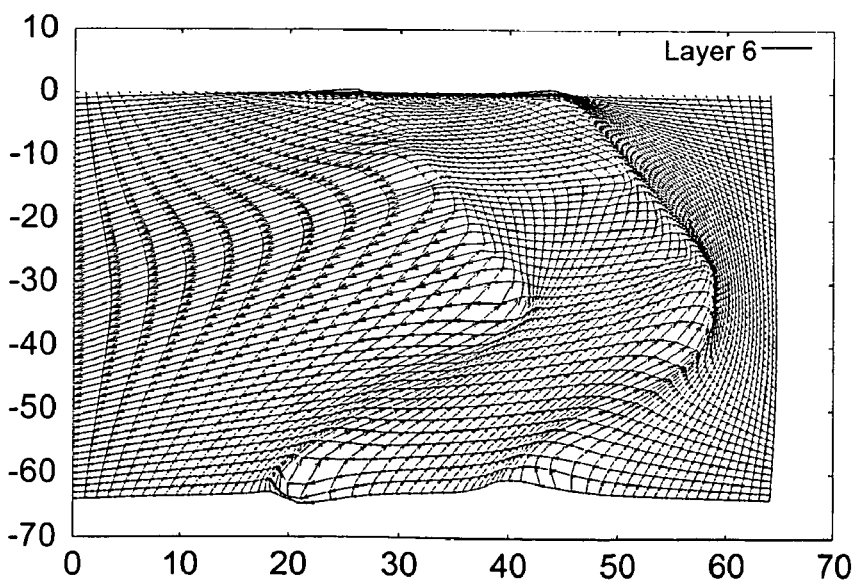
FIG. 24E is an explanatory diagram of a lattice map of the destination image where corresponding points in the source image are reflected.

FIG. 23 is an explanatory diagram of a change of an image where an object employed in the simulation of the third embodiment is reversed. In the simulation, an object of the source image shown on the left side of the diagram makes a reversing movement of a large amount of displacement up to the destination image shown on the right side of the diagram.

The simulation of the image matching according to the third embodiment is performed on such a source image and a destination image. The results of simulation are shown in FIGS. 24A to 24E.

FIGS. 24A to 24E are explanatory diagrams of lattice maps of the destination image where the corresponding points in the source image are reflected. FIGS. 24A to 24E represent lattice maps of layer 2 (Layer=2) to layer 6 (Layer=6) sequentially in this order. As shown in FIGS. 24A to 24E, corresponding points are correctly found to follow the reversing movement with a large amount of displacement of respective pixels.

Thus, according to the image matching of the motion compensating apparatus according to the third embodiment, the downsampling in a spatial direction is performed on the source image and the destination image plural times, to generate a hierarchical structure of the image, and the image matching is performed sequentially from the upper layer to the lower layer. Hence, the highly robust and highly precise matching can be performed for each pixel covering any motion whether rough or subtle.

Next, a fourth embodiment will be described.

In the motion compensating apparatus according to the third embodiment, the downsampling is performed on the source image and the destination image to generate a hierarchical structure, so as to allow for the highly precise image matching on the image with small or large motion. However, depending on the manner of downsampling in the spatial direction into the hierarchy, the motion element cannot be properly propagated up to the upper layer and the matching may become insufficient at the upper layer.

Hence, in the motion compensating apparatus according to the fourth embodiment, plural manners of downsampling are employed for the creation of plural hierarchical pyramid structures. Each layer in the structure is connected with each other via a spring. Thus, the dependency on the manner of downsampling can be alleviated.

The functional structure of the motion compensating apparatus according to the fourth embodiment is similar to that of the first embodiment. In addition, the overall process of image matching by the motion compensating apparatus 100 according to the fourth embodiment is similar to that of the third embodiment.

Here in the fourth embodiment, plural multiresolution filters, such as critical point filters (CPF), are employed for the downsampling. The multiresolution filter serves to detect a singular point via a two-dimensional search on the original image, to extract the detected singular point to generate another image with a lower resolution than the original image. Here, the singular point means a pixel which has a maximum pixel value or a minimum pixel value, for example.

Figure 25:
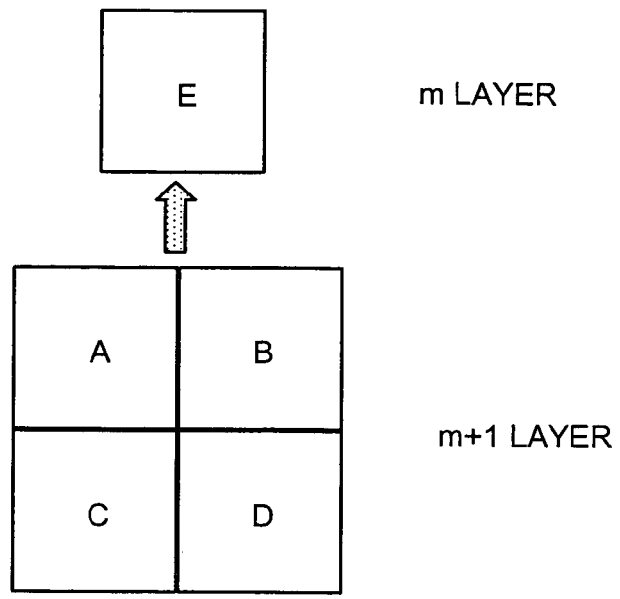
FIG. 25 is an explanatory diagram of downsampling at generation of an image of m layer from an image of m+1 layer by a motion compensating apparatus according to a fourth embodiment.

FIG. 25 is an explanatory diagram of downsampling for generation of an $m^{th}$ layer image from an m+1th layer image by a motion compensating apparatus according to the fourth embodiment. As shown in FIG. 25, at the downsmapling of the m+1th layer to the $m^{th}$ layer, four multiresolution filters are structured as represented by Equation (30) in the fourth embodiment:

$CPF0: E=\min(\min(A,B),\min(C,D))$ $CPF1: E=\max(\min(A,B),\min(C,D))$ $CPF2: E=\min(\max(A,B),\max(C,D))$ $CPF3: E=\max(\max(A,B),\max(C,D))$ (30)

Here, the characters A, B, C, and D denote luminance values of respective pixels. Through the downsampling with the multiresolution filters according to the fourth embodiment as represented by Equation (30), a light pixel part and a dark pixel part in the image are extracted respectively for the formation of the four-layer hierarchical structure.

In the motion compensating apparatus according to the fourth embodiment, when the model generating unit 111 generates the image matching state transition model, the respective layers of the pyramid structure are connected via springs to cause elastic force to work between the layers. If the multiresolution filters represented by Equation (30) are denoted as s=0, 1, 2, 3 sequentially from the upper expression described above, and the multiresolution filter s=0 and the multiresolution filter s=3 are arranged adjacent to each other on a ring, the elastic force caused by the connection between the multiresolution filters can be represented by Equation (31):

$$F_s = k_s(q_{(i,s-q)} - q_{(i,s)}) + k_s(q_{(i,s+1)} - q_{(i,s)})$$

s=0, 1, 2, 3 (31)

where $k_s$ is a constant of spring, and $q_{(i,s)}$ is a lattice point of multiresolution filter s.

Hence, the ordinary differential equation (equation of motion) of the image matching state transition model generated by the model generating unit 111 can be represented as Equation (32) instead of Equation (17) of the embodiment:

$$\ddot{q}_{(i,s)} = u(q_{(i,s)}) + k(q_{(i,s)}) - \mu\dot{q}_{(i,s)} + F_s(q_{(i,s)})$$ (32)

Figure 26:
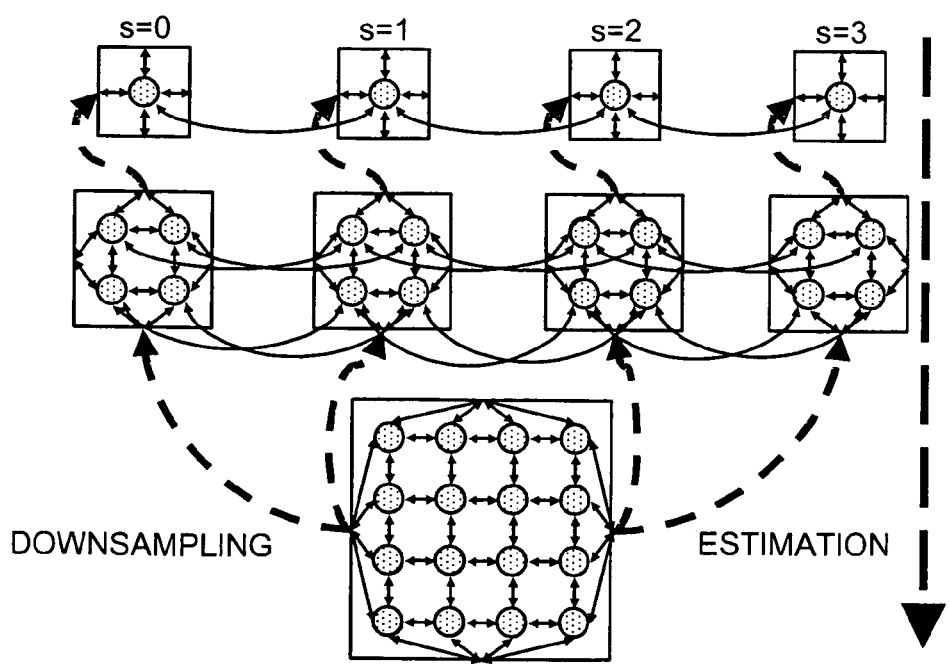
FIG. 26 is an explanatory diagram of a state of the image matching state transition model where layers in a hierarchical structure of images generated by four multiresolution filters (s=0 to 3) are connected via springs so as to receive a elastic force.

FIG. 26 is an explanatory diagram of a state of the image matching state transition model where the respective layers of the hierarchical structure of the image generated by four multiresolution filters (s=0 to 3) are connected via springs to generate elastic force.

The numerical analyzing unit 112 according to the fourth embodiment solves the ordinary differential equation represented by Equation (32) by the numerical analysis with a similar Euler's method as employed in the first embodiment. Here, the calculation of numerical analysis of $u(q_{(i,s)})$ and $F_s(q_{(i,s)})$ is performed by the potential energy calculator 151, the calculation of the numerical analysis of $k(q_{(i,s)})$ is performed by the elastic force calculator 152, and the calculation of the numerical analysis of $\mu\dot{q}_{(i,s)}$ is performed by the friction force calculator 153.

Thus, the image matching can be realized with the respective multiresolution filters connected with each other.

Thus, in the motion compensating apparatus according to the fourth embodiment, the plural pyramid-like hierarchical structures are formed for the source image and the destination image by the plural multiresolution filters, and the image matching state transition model is created so that the elastic force works at each hierarchical structure, whereby the dependency on the manner of downsampling is alleviated and the image matching can be realized with higher precision.

Next, a fifth embodiment will be described.

In the motion compensating apparatus according to the second embodiment, blocks are set as to include plural pixels and pixels in the block are connected with each other via a spring to cause elastic force therebetween. Then the force of the potential energy of the pixel gradient is calculated for the creation of the image matching state transition model. However, according to the second embodiment, the calculation cost at the image matching may increase with the increase in the number of pixels to degrade the processing efficiency.

Hence, a motion compensating apparatus according to the fifth embodiment connects blocks which are collections of pixels with a spring to cause elastic force to work between the blocks for the creation of the image matching state transition model.

The functional structure of the motion compensating apparatus according to the fifth embodiment is similar to that of the first embodiment. In addition, the overall process sequence of the image matching is similar to that in the first embodiment described above with reference to FIG. 2.

The image matching state transition model generated by the model generating unit 111 in the motion compensating apparatus according to the fifth embodiment is different from the model generated in the motion compensating apparatus according to the second embodiment.

Figure 27:
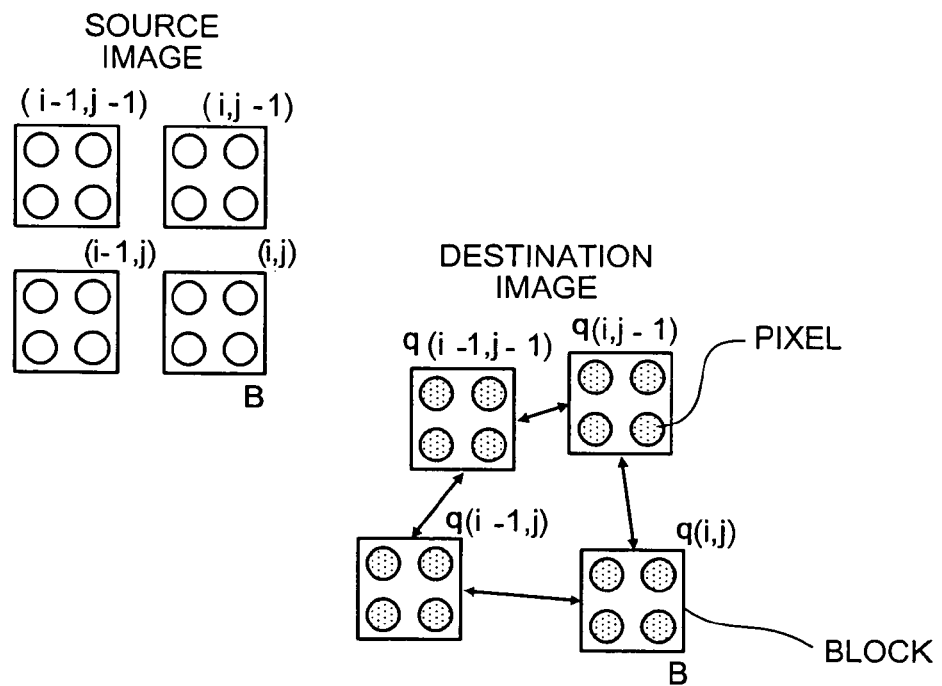
FIG. 27 is an explanatory diagram of a state of the image matching state transition model in an image matching process by a motion compensating apparatus according to a fifth embodiment.

FIG. 27 is an explanatory diagram of a state of the image matching state transition model at image matching in the motion compensating apparatus according to the fifth embodiment. In the fifth embodiment, the model generating unit 111 creates a model where the blocks formed from plural pixels are connected via a spring as shown in FIG. 27 to generate elastic force between the blocks.

Here, if a point on the source image is represented as $i=(i,j)^T$ (where i=1 to M, j=1 to N), and a point in the destination image corresponding to the point i in the source image is represented as $q_i$, the mapping relation of Equation (33) holds for the point i of the source image and the point $q_i$ of the destination image:

$$q_i = f(i) \tag{33}$$

Here, the point i of the source image and the point $q_i$ of the destination image are set as absolute positions and B is set as a relative target block of the operation. Here, the force $u(q_i)$ of the potential energy caused by the pixel gradient for each block can be represented by Equation (34):

$$u(q_i) = \frac{\frac{1}{N_B}\sum_{b \in B}|I_Q(q_i + u_d + b) - I_Q(q_i + b)|}{\|u_d\|} u_d \tag{34}$$

$$u_d = q_{\min} - q_i$$

$$q_{\min} = \arg\min_{q_\Omega \in \Omega} \frac{1}{N_B}\sum_{b \in B}|I_P(i + b) - I_Q(q_\Omega + b)|$$

According to the fifth embodiment, the model generating unit 111 generates the image matching state transition model as represented by Equation (17) based on the definition of the force $u(q_i)$ of the potential as represented by Equation (34), and the numerical analyzing unit 112 solves the ordinary differential equation as represented by Equation (17). Here, the numerical analyzing unit 112 solves Equation (17) similarly to the first embodiment, and employs Equation (34) for finding the force $u(q_i)$ of the potential energy of the pixel gradient.

Thus, the motion compensating apparatus according to the fifth embodiment creates the image matching state transition model where the blocks which are collections of pixels are connected via a spring to cause elastic force therebetween, whereby allowing for the realization of more highly robust and precise image matching.

Next, a sixth embodiment will be described.

The image matching state transition model created by the motion compensating apparatus according to the first to the fifth embodiment considers the potential energy based on the difference value of the luminance of the pixels. The force of the potential energy, however, does not include the color component. Hence, when the source image and the destination image contain objects with little luminance difference though different in colors, such objects may not be recognized, whereby the highly precise image matching may be hampered.

Hence, a motion compensating apparatus according to the sixth embodiment creates the image matching state transition model utilizing the force of potential energy including the color information.

The functional structure of the motion compensating apparatus according to the sixth embodiment is similar to that of the first embodiment. In addition, the overall process sequence of the image matching is similar to that of the first embodiment described with reference to FIG. 2.

In the sixth embodiment, the model generating unit 111 generates a different image matching state transition model from those generated in the first to the fifth embodiments. The model generating unit 111 according to the sixth embodiment includes the color information of LUV color system as a color space to the force of the potential energy.

The sixth embodiment adopts LUV color system because RGB color system has a bias in color distribution when represented as a chromaticity diagram. One color space with little bias in color distribution may be XYZ color system. In the XYZ color system, the distance between two colors can be calculated. If the same distance can be viewed as to represent same color difference regardless of the color type, the distance can be utilized for the determination of correlation between images. In other words, a short distance between two colors indicates similarity of two colors, whereas a long distance between two colors indicates wider difference between two colors. Hence, a collection of colors with short distances can be determined to have a higher correlation to the image than a collection of colors with long distances.

In general, however, it is known that there is little correlation between the distance in the XYZ color system and the recognition of color difference. Hence, the sixth embodiment adopts the LUV color system, which is a uniform color space where the distance and the recognition of color difference have a higher correlation, to include the color information to the force of the potential energy, for the creation of the image matching state transition model. Here, LAB color system which is also a uniform color space may be employed for the creation of the image matching state transition model.

The color difference between two colors in the LUV color system can be represented as Equation (35):

$$\Delta Euv^* = [(\Delta L^*)^2 + (\Delta u^*)^2 + (\Delta v^*)^2]^{1/2}$$

$$\Delta L^* = L^*_2 - L^*_1$$

$$\Delta u^* = u^*_2 - u^*_1$$

$$\Delta v^* = v^*_2 - v^*_1 \tag{35}$$

where $\Delta Euv^*$ is color difference between two colors, and $L_1^*, u_1^*, v_1^*$ and $L_2^*, u_2^*, v_2^*$ are $L^*u^*v^*$ of two colors.

When the force $u(q_i)$ of the potential energy based on the difference value of color is represented based on Equation (35), Equation (36) is obtained:

$$u(q_i) = \frac{\Delta Euv(q_i + u_d, q_i)}{\|u_d\|} u_d \quad (36)$$

$$u_d = q_{\min} - q_i$$

$$q_{\min} = \arg\min_{q \in \Omega} \Delta Euv(i, q)$$

$$\Delta Euv(x, y) = ((L_P(x) - L_Q(y))^2 + (u_P(x) - u_Q(y))^2 +$$
$$+ (v_P(x) - v_Q(y))^2)^{1/2}$$

where $L_P, u_P, v_P$ is L*u*v* of source image, and $L_Q, u_Q, v_Q$ is L*u*v* of destination image.

According to the sixth embodiment, the model generating unit 111 generates the image matching state transition model as represented by Equation (17) based on the definition of the force $u(q_i)$ of the potential by Equation (36), and the numerical analyzing unit 112 solves the ordinary differential equation as represented by Equation (17). Here, the numerical analyzing unit 112 solves the equation similarly to the first embodiment and employs Equation (36) for finding the force $u(q_i)$ of the potential energy of the pixel gradient.

Thus, the motion compensating apparatus according to the sixth embodiment utilizes the force of the potential energy including the color information of LUV color system for the creation of the image matching state transition model. Hence, even when the source image and the destination image contain objects with little luminance difference though different in colors, the sixth embodiment can realize highly precise and robust image matching.

Next, a seventh embodiment will be described.

The motion compensating apparatus according to the first to the fifth embodiments creates the image matching state transition model based on the luminance difference, where the force of the potential of the pixel gradient is produced from the difference value of the luminance. The model is based on an assumption that there is no luminance difference at the same lattice point of the pixel and the difference value of the luminance decreases smoothly along the trajectory of the movement. Hence, when there is a change in luminance, the image matching may become imprecise.

Figure 28:
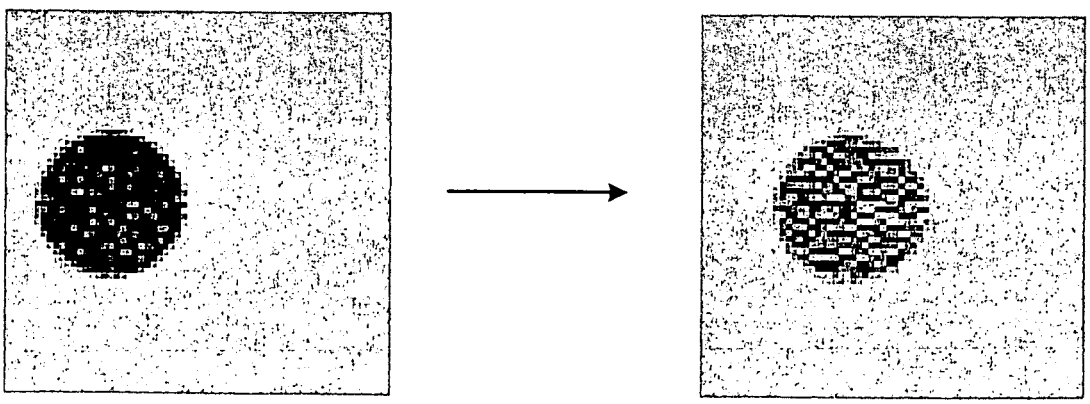
FIG. 28 is an explanatory diagram of an example where luminance change occurs at a surface of an object which moves between the source image and the destination image.
Figure 29:
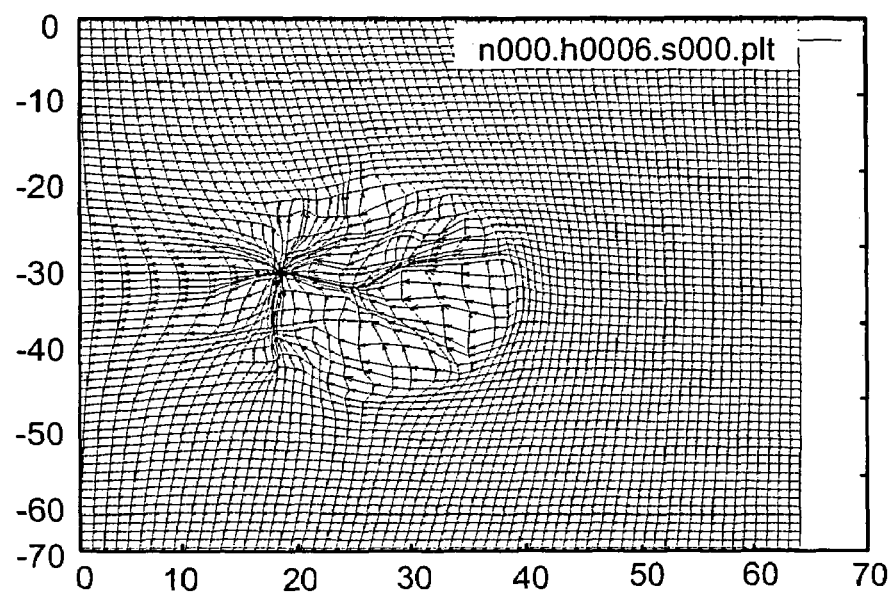
FIG. 29 is an explanatory diagram of a lattice map of the destination image where corresponding points in the source image are reflected, the lattice map being obtained at the image matching on the image of FIG. 28.

For example, assume that the image matching is performed on the image where luminance changes on the surface of the object which moves from the source image to the destination image as shown in FIG. 28. FIG. 29 is an explanatory diagram of the lattice map of the destination image where the corresponding points on the source image are reflected at the image matching of the image shown in FIG. 28. Here, as can be seen from FIG. 29, the result of image matching is distorted and corresponding points do not appear correctly.

Hence, a motion compensating apparatus according to the seventh embodiment creates the image matching state transition model based on the force of the image-correlated potential energy which is robust over the luminance change.

The functional structure of the motion compensating apparatus according to the seventh embodiment is similar to that of the first embodiment. In addition, the overall process sequence of image matching is similar to that of the first embodiment described with reference to FIG. 2.

According to the seventh embodiment, the model generating unit 111 generates the image matching state transition model where the force of the image-correlated potential energy is formulated according to the cross-correlation. The cross-correlation is statistically called a correlation coefficient and an expected value thereof is set to zero at a normalized covariance. Since the cross-correlation is not an evaluation of the difference between expected values, such technique is expected to enhance robustness over the luminance change compared with the technique based on the difference value of the luminance.

The force $u(q_i)$ of the image-correlated potential energy where the cross-correlation is considered can be represented by Equation (37):

$$u(q_i) = \frac{dif}{\|u_d\|} u_d \quad (37)$$

$$u_d = q_{\min} - q_i$$

$$q_{\min} = \arg\min\left\{1.0 - \frac{\sum_{w \in B} I_P(i+w) I_Q(q+w)}{\sqrt{\sum_{w \in B} I_P(i+w)^2} \sqrt{\sum_{w \in B} I_Q(q+w)^2}}\right\}$$

$$dif = 255 \left| \frac{\sum_{w \in B} I_P(i+w) I_Q(q_{\min}+w)}{\sqrt{\sum_{w \in B} I_P(i+w)^2} \sqrt{\sum_{w \in B} I_Q(q_{\min}+w)^2}} - \frac{\sum_{w \in B} I_P(i+w) I_Q(q_i+w)}{\sqrt{\sum_{w \in B} I_P(i+w)^2} \sqrt{\sum_{w \in B} I_Q(q_i+w)^2}} \right|$$

According to the seventh embodiment, the model generating unit 111 creates the image matching state transition model represented by Equation (17) based on the definition of the force $u(q_i)$ of the potential by Equation (37), and the numerical analyzing unit 112 solves the ordinary differential equation as represented by Equation (17). Here, the numerical analyzing unit 112 solves Equation (17) similarly to the first embodiment and employs Equation (37) for finding the force $u(q_i)$ of the potential energy of the pixel gradient.

Figure 30:
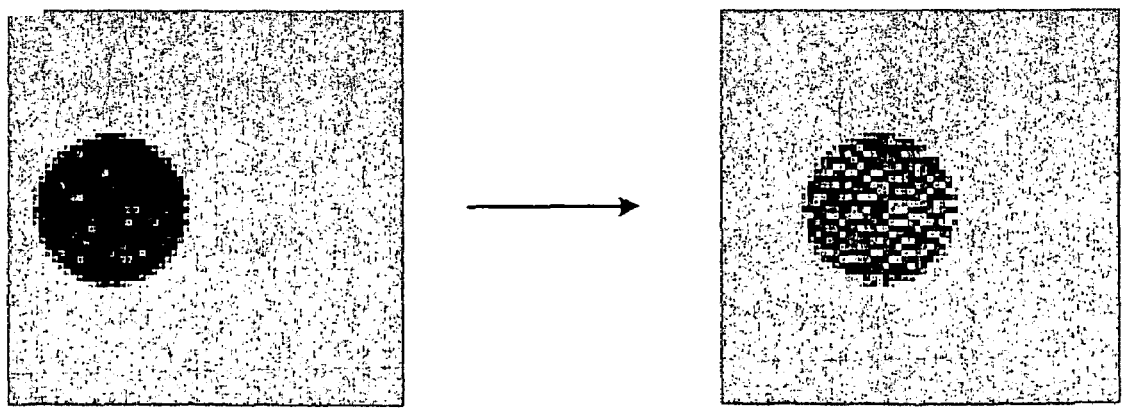
FIG. 30 is an explanatory diagram of a change in an image where luminance change occurs at a surface of an object which moves between the source image and the destination image.

FIG. 30 is an explanatory diagram of a change in the image when luminance changes on the surface of the object that moves from the source image to the destination image. A result of image matching on such image according to the seventh embodiment is shown in FIG. 31.

Figure 31:
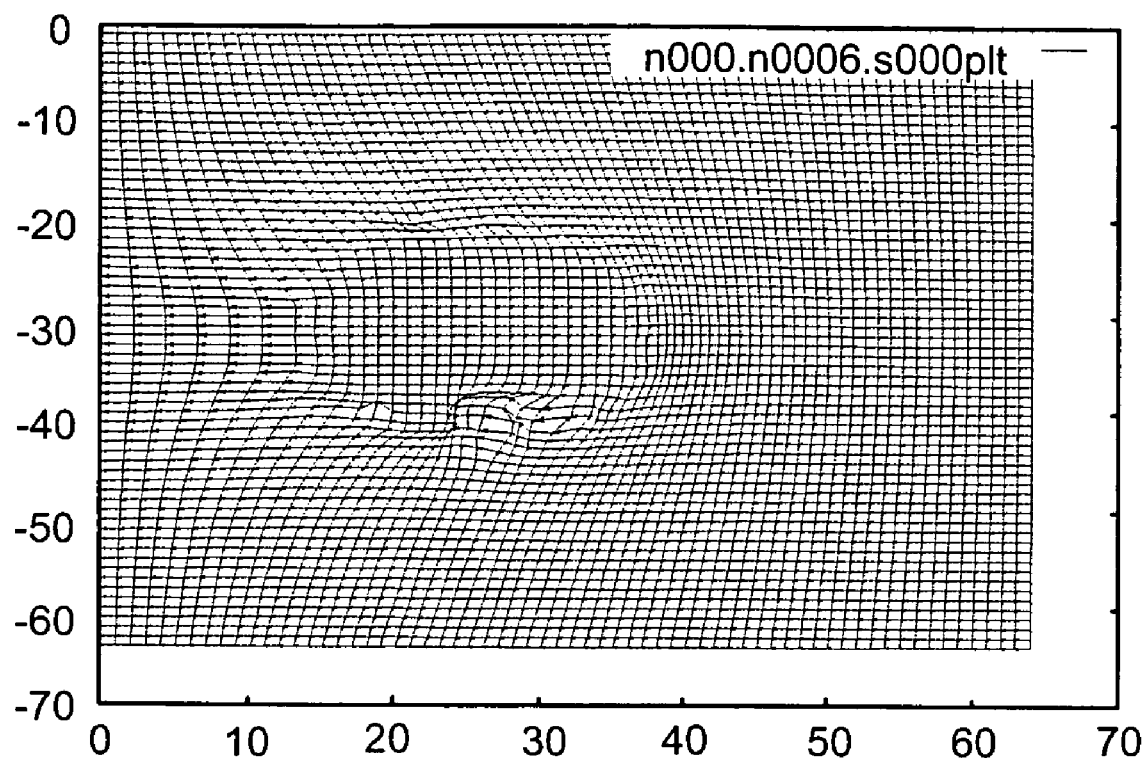
FIG. 31 is an explanatory diagram of a lattice map of the destination image where corresponding points in the source image are reflected.

FIG. 31 is an explanatory diagram of the lattice map of the destination image where the corresponding points in the source image are reflected. It can be seen from the FIG. 31 that corresponding points can be correctly found even when the luminance changes on the surface of the object.

Thus, the motion compensating apparatus according to the seventh embodiment creates the image matching state transition model based on the formulation of the force of the image-correlated potential energy utilizing the cross-correlation. Hence, a highly precise image matching can be realized even when the luminance changes on the surface of the object.

It should be noted that the image matching state transition model may be created for the image matching based on an appropriate combination of the force of the potential energy of the luminance gradient of pixel, the force of potential energy based on the difference value of the color, and the force of the image-correlated potential energy where cross-correlation is considered described above with reference to embodiments.

Provided that the force of the potential energy of the pixel luminance gradient is denoted by $u_1(q_i)$, the force of the potential energy based on the difference value of colors is denoted by $u_2(q_i)$, and the force of the image-correlated potential energy where cross-correlation is considered is denoted by $u_3(q_i)$. Then, an equation of motion of the image matching state transition model based on the combination of the force $u_1(q_i)$ of the potential energy of the pixel luminance gradient, and the force $u_2(q_i)$ of the potential energy of the color difference value can be represented as Equation (38):

$$\ddot{q}_i = [\alpha u_1(q_i) + \beta u_2(q_i)] + k(q_i) - \mu \dot{q}_i \quad (38)$$

Here, a and β are weighting factors.

Then, the potential energy calculator 151 calculates the force $u_1(q_i)$ of the potential energy of the pixel luminance gradient and the force $u_2(q_i)$ of the potential energy based on the color difference value according to Equation (38).

In addition, an equation of motion of the image matching state transition model based on a combination of the force $u_2(q_i)$ of the potential energy based on the color difference value and the force $u_3(q_i)$ of the image-correlated potential energy where the cross-correlation is considered can be represented by Equation (39):

$$\ddot{q}_i = [\alpha u_2(q_i) + \beta u_3(q_i)] + k(q_i) - \mu \dot{q}_i \quad (39)$$

Here, a and β are weighting factors.

Then, the potential energy calculator 151 calculates the force $u_2(q_i)$ of the potential energy based on the color difference value and the force $u_3(q_i)$ of the image-correlated potential energy where cross-correlation is considered according to Equation (39).

In addition, an equation of motion of the image matching state transition model based on a combination of the force $u_1(q_i)$ of the potential energy of the pixel luminance gradient and the force $u_3(q_i)$ of the image-correlated potential energy where the cross-correlation is considered can be represented by Equation (40):

$$\ddot{q}_i = [\alpha u_1(q_i) + \beta u_3(q_i)] + k(q_i) - \mu \dot{q}_i \quad (40)$$

where a and β are weighting factors.

Then, the potential energy calculator 151 performs calculates the force $u_1(q_i)$ of the potential energy of the pixel luminance gradient and the force $u_3(q_i)$ of the image-correlated potential energy where cross-correlation is considered according to Equation (40).

In addition, an equation of motion of the image matching state transition model based on a combination of the force $u_1(q_i)$ of the potential energy of the pixel luminance gradient, the force $u_2(q_i)$ of the potential energy based on the color difference value, and the force $u_3(q_i)$ of the image-correlated potential energy where the cross-correlation is considered can be represented by Equation (41):

$$\ddot{q}_i = [\alpha u_1(q_i) + \beta u_2(q_i) + \gamma u_3(q_i)] + k(q_i) - \mu \dot{q}_i \quad (41)$$

where a, β and γ are weighting factors.

Then, the potential energy calculator 151 calculates the force $u_1(q_i)$ of the potential energy of the pixel luminance gradient, the force $u_2(q_i)$ of the potential energy based on the color difference value, and the force $u_3(q_i)$ of the image-correlated potential energy where cross-correlation is considered according to Equation (41).

Through the image matching utilizing the image matching state transition model based on an appropriate combination of three forces of potential energy, more highly robust and precise image matching is allowed on pixel-to-pixel basis.

The motion compensating apparatus according to the first to the seventh embodiment includes a controller such as a central processing unit (CPU), a storage such as a read only memory (ROM) and a random access memory (RAM), an external storage such as a hard disc drive (HDD), and a CD drive, a display such as a monitor screen, and an input device such as a keyboard and a mouse, thereby forming a conventional computer-utilizing hardware structure.

The motion compensating program executed by the motion compensating apparatus according to the first to the seventh embodiments is recorded on a computer-readable recording medium such as a CD-ROM, a flexible disc (FD), a CD-R, and a digital versatile disk (DVD) in an installable or an executable format file for provision.

Further, the motion compensating program executed by the motion compensating apparatus according to the first to the seventh embodiments may be stored in a computer connected to a network such as the Internet, and downloaded via the network for provision. Still further, the motion compensating program executed by the motion compensating apparatus according to the first to the seventh embodiment may be provided or distributed via a network such as the Internet.

Still further, the motion compensating program executed by the motion compensating apparatus according to the first to the seventh embodiments may be previously embedded into ROM or the like for provision.

The motion compensating program executed by the motion compensating apparatus according to the first to the seventh embodiments has a module structure including the respective units as described above (i.e., model generating unit 111, numerical analyzing unit 112, scale converting unit 120, and motion compensating unit 130). In an actual hardware, the CPU reads out the motion compensating program from the recording medium and executes the same to load the respective units on a main memory, thereby generating the model generating unit 111, the numerical analyzing unit 112, the scale converting unit 120, and the motion compensating unit 130 on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image matching apparatus comprising:
a central processing unit that executes a numerical analyzing unit and a mapping unit, wherein:
the numerical analyzing unit solves an equation of motion numerically, the equation of motion including a potential energy force applied on each of lattice points each corresponding to a source pixel at a source position of each of the lattice points on a source image, the numerical analyzing unit including a potential energy force calculator that calculates the potential energy force for each of the lattice points based on a pixel value gradient between the source pixel and pixels in region corresponding to the current position on the destination image; and
the mapping unit sets the source position and a convergence value of the current position as a mapping relation between the source image and the destination image.

2. The apparatus according to claim 1, wherein the equation of motion further includes an elastic force between lattice points, and the numerical analyzing unit further includes an elastic force calculator that calculates the elastic force.

3. The apparatus according to claim 2, wherein the elastic force further includes a boundary elastic force between each of peripheral lattice points and each of stable points on a wall, the wall surrounding the lattice points, the peripheral lattice points being a part of the lattice points, the peripheral lattice points having the source position which is peripheral on the source image.

4. The apparatus according to claim 1, wherein the equation of motion further includes a friction force acting to each of the lattice points, and the numerical analyzing unit includes a friction force calculator that calculates the friction force for each of the lattice points.

5. The apparatus according to claim 1, wherein a part of the lattice points belongs to a block, and the potential energy force calculator sets the potential energy force of the lattice points in the block to a common value.

6. The apparatus according to claim 1, wherein:

the central processing unit further executes a sampling unit that performs sampling of a first layer of the source image and the destination image to generate a second layer of the source image and the destination image, wherein the numerical analyzing unit solves the equation of motion for the second layer of the source image and the destination image, wherein the mapping unit sets as the mapping relation of the second layer between the second layer of the source image and the second layer of the destination image, wherein the numerical analyzing unit sets the source position of the each lattice point based on the mapping relation of the second layer when solving the equation of motion for the first layer of the source image and the destination image.

7. The image matching apparatus according to claim 1, wherein:

the central processing unit further executes a sampling unit that performs sampling of a first layer of the source image and the destination image to generate a second layer of the source image and the destination image, wherein the numerical analyzing unit solves the equation of motion including an inter-layer elastic force between each of the lattice points for the first layer and each of the lattice points for the second layer having the source position corresponding to the each lattice point for the first layer.

8. The apparatus according to claim 2, wherein a part of the lattice points belongs to a block, and the elastic force calculator sets the elastic force of the lattice points in the block to a common value.

9. The apparatus according to claim 1, wherein the potential energy force calculator calculates the potential energy force of the each lattice point using luminosity information of the source pixel and a pixel corresponding to the current position on the destination image.

10. The image matching apparatus according to claim 1, wherein the potential energy force calculator calculates the potential energy force of the each lattice point using color information of the source pixel and a pixel corresponding to the current position on the destination image.

11. The apparatus according to claim 10, wherein the color information is of a color system in an uniform space, and the potential energy force calculator calculates color difference to calculate the potential energy force of the each lattice point.

12. The image matching apparatus according to claim 1, wherein the potential energy force calculator calculates the potential energy force of the each lattice point using cross-correlation between luminosity information of the source pixel and a pixel corresponding to the current position on the destination image.

13. A method of matching images executed by a central processing unit of an image matching apparatus, the method comprising:

solving an equation of motion numerically, the equation of motion including a potential energy force applied on each of lattice points each corresponding to a source pixel at a source position of each of the lattice points on a source image, the numerical analyzing unit including a potential energy force calculator that calculates the potential energy force for each of the lattice points based on a pixel value gradient between the source pixel and pixels in region corresponding to the current position on the destination image; and setting the source position and a convergence value of the current position as a mapping relation between the source image and the destination image.

14. A computer program product embodied on a computer readable medium, the computer programmed product including programmed instructions which, when executed by a computer, cause the computer to perform a method comprising:

solving an equation of motion numerically, the equation of motion including a potential energy force applied on each of lattice points each corresponding to a source pixel at a source position of each of the lattice points on a source image, the numerical analyzing unit including a potential energy force calculator that calculates the potential energy force for each of the lattice points based on a pixel value gradient between the source pixel and pixels in region corresponding to the current position on the destination image; and setting the source position and a convergence value of the current position as a mapping relation between the source image and the destination image.

* * * * *